(12) United States Patent
Horikawa

(10) Patent No.: US 8,525,957 B2
(45) Date of Patent: Sep. 3, 2013

(54) DISPLAY APPARATUS, ELECTRONIC EQUIPMENT, MOBILE ELECTRONIC EQUIPMENT, MOBILE TELEPHONE, AND IMAGE PICKUP APPARATUS

(75) Inventor: Yoshiaki Horikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 272 days.

(21) Appl. No.: 13/065,831

(22) Filed: Mar. 29, 2011

(65) Prior Publication Data

US 2011/0285936 A1    Nov. 24, 2011

(30) Foreign Application Priority Data

Apr. 2, 2010    (JP) ................................. 2010-086193

(51) Int. Cl.
*G02F 1/1335* (2006.01)
*G02F 1/1333* (2006.01)

(52) U.S. Cl.
USPC .............................. 349/95; 349/106; 349/110

(58) Field of Classification Search
USPC ........................................................... 349/95
See application file for complete search history.

(56) References Cited

U.S. PATENT DOCUMENTS

| | | | | |
|---|---|---|---|---|
| 7,001,019 B2 * | 2/2006 | Takagi et al. | ................. | 351/211 |
| 7,278,741 B2 * | 10/2007 | Okamoto et al. | ............. | 351/206 |
| 7,489,375 B2 * | 2/2009 | Lee et al. | ....................... | 349/108 |
| 2002/0051118 A1 * | 5/2002 | Takagi et al. | .................. | 351/211 |
| 2003/0081153 A1 * | 5/2003 | Kobayashi et al. | ............. | 349/95 |
| 2006/0114374 A1 * | 6/2006 | Segawa et al. | .................. | 349/95 |
| 2006/0268196 A1 * | 11/2006 | Jung | ............................... | 349/95 |
| 2007/0019132 A1 * | 1/2007 | Kim et al. | ....................... | 349/95 |
| 2007/0153160 A1 * | 7/2007 | Lee et al. | ......................... | 349/95 |
| 2011/0285936 A1 * | 11/2011 | Horikawa | ........................ | 349/61 |
| 2011/0317272 A1 * | 12/2011 | Horikawa | ........................ | 359/619 |
| 2012/0200810 A1 * | 8/2012 | Horikawa | ........................ | 349/95 |

FOREIGN PATENT DOCUMENTS

| | | |
|---|---|---|
| JP | 3552413 | 5/2004 |
| JP | 2007-128355 | 5/2007 |
| JP | 2009-063624 | 3/2009 |

\* cited by examiner

*Primary Examiner* — Rhonda Peace
(74) *Attorney, Agent, or Firm* — Kenyon & Kenyon LLP

(57) ABSTRACT

In a display apparatus which includes a liquid crystal layer, two electrode layers which sandwich the liquid crystal layer, and a black matrix, and the black matrix has a plurality of light exit points which transmit light, and a light exit point group includes at least one light exit point, and the display apparatus has a plurality of lenses which project the light exit point group, and the plurality of lenses project images of the light exit point groups to be overlapped, and projected images of the plurality of lenses are formed on a retina of an eye of an observer by inducing overlapping of light exit points in the light exit point group which have been overlapped upon being projected by the lenses, on a pupil of the eye of the observer.

26 Claims, 24 Drawing Sheets

FIG. 19

| R | G | B | R | G | B |
|---|---|---|---|---|---|
| B | R | G | B | R | G |
| G | B | R | G | B | R |
| R | G | B | R | G | B |
| B | R | G | B | R | G |

DISPLAY APPARATUS, ELECTRONIC EQUIPMENT, MOBILE ELECTRONIC EQUIPMENT, MOBILE TELEPHONE, AND IMAGE PICKUP APPARATUS

CROSS-REFERENCE TO RELATED APPLICATION

The present application is based upon and claims the benefit of priority from the prior Japanese Patent Application No. 2010-086193 filed on Apr. 2, 2010; the entire contents of which are incorporated herein by reference.

BACKGROUND OF THE INVENTION

1. Field of the Invention

The present invention relates to a display apparatus, and an electronic equipment, a mobile electronic equipment, a mobile telephone, and an image pickup apparatus which include the display apparatus.

2. Description of the Related Art

As a display apparatus which displays picture images and characters, display apparatuses such as a liquid crystal display and a plasma display are available. However, these display apparatuses have a drawback that diopter adjustment is not available. With the aging of society, there is an increase in the number of elderly people having farsightedness due to old age and a display apparatus particularly a flat-panel display (FPD) which is capable of diopter adjustment has been sought. With widespread use of mobile telephones and digital cameras, there is an increase in the number of occasions of looking at a display by the FPD outdoor. Furthermore, a use of electronic books instead of paper books has been increasing. It is extremely cumbersome to put on or take off reading glasses every time at the time of looking at the FPD of a mobile equipment such as a mobile telephone and a digital camera.

There have been more occasions of looking at the FPD of a mobile telephone in situations such as using mail and games, rather than using the mobile telephone as a telephone. In a digital single-lens reflex camera, the FPD is used as a live-view monitor, and in this digital single-lens reflex camera, it is not practical to put on or take off reading glasses every time for looking the live-view monitor while looking at a distant object. Furthermore, necessity of looking at a monitor is increasing because a GUI (Graphical user interface) is usually used through the monitor for an operation such as changing shooting moods.

Moreover, at the time of looking at a monitor of a car navigation system, an observer is busy driving a car. Therefore, it is dangerous to put on or take off the reading glasses, and putting on and taking off the reading glasses is practically impossible. In other situations such as, while observing a liquid crystal screen of a personal computer (PC), it is cumbersome for an observer to put on the reading glasses every time. Consequently, an electronic equipment in which it is possible to see a monitor without putting on or taking off the reading glasses has been sought.

Namely, a FDP have not existed in which a just focused picture image could be observed regardless of whether or not the reading glasses is used. Moreover, there has been no electronic equipment with such monitor mounted. Such problems have been pointed out recently, and in Japanese Patent No. 3552413, a method of displaying a corrected picture image subjected to an edge enhancement has been proposed. Moreover, in Japanese Patent Application Laid-open Publication No. 2007-128355, a method of using pre-corrected picture image generated by an inverse matrix of Toeplitz matrix has been proposed. Furthermore, in Japanese Patent application Laid-open Publication No. 2009-63624, a method of using a magnifying lens has been proposed.

SUMMARY OF THE INVENTION

According to the present invention, a display apparatus includes
a liquid crystal layer,
two electrode layers which sandwich the liquid crystal layer, and
a black matrix, and
the black matrix has a plurality of light exit points which transmit light, and
a light exit point group includes at least one light exit point, and
the display apparatus has a plurality of lenses which project the light exit point group, and
the plurality of lenses project images of the light exit point groups to be overlapped, and
projected images of the plurality of lenses are formed on a retina of an eye of an observer by inducing overlapping of light exit points in the light exit point group, which have been projected by the lenses to be overlapped, on a pupil of the eye of the observer. In the display apparatus according to the present invention, a size of the image of the light exit point projected by the lens is smaller than a diameter of the pupil of the eye of the observer.

According to the present invention, an electronic equipment includes a display apparatus according to the present invention.

According to the present invention, a mobile electronic equipment includes the display apparatus according to the present invention.

According to the present invention, a mobile telephone includes the display apparatus according to the present invention.

According to the present invention, an image pickup apparatus includes a display apparatus according to the present invention.

BRIEF DESCRIPTION OF THE DRAWINGS

FIG. 19 is a perspective view showing a pixel arrangement for a color display of a liquid crystal display;

DETAILED DESCRIPTION OF THE INVENTION

Exemplary embodiments of a display apparatus, and an electronic equipment, a mobile electronic equipment, a mobile telephone and an image pickup apparatus which include the display apparatus will be described below in detail with reference to the accompanying diagrams. However, the present invention is not restricted to the embodiments described below.

It is well known that a depth of field increases when the diaphragm of a lens in a camera is narrowed, and that a picture in focus from a near point to a distant point can be obtained. Therefore, by increasing the depth of field by artificially narrowing a pupil of an eye, it is possible to focus at a near point at where it is difficult to focus for a presbyopic eye.

The present invention provides a display apparatus in which a pupil of an eye is narrowed equivalently, and an electronic equipment, a mobile electronic equipment, a mobile telephone and an image pickup apparatus which include the display apparatus.

Basic Structure of Embodiments

Figure 1:
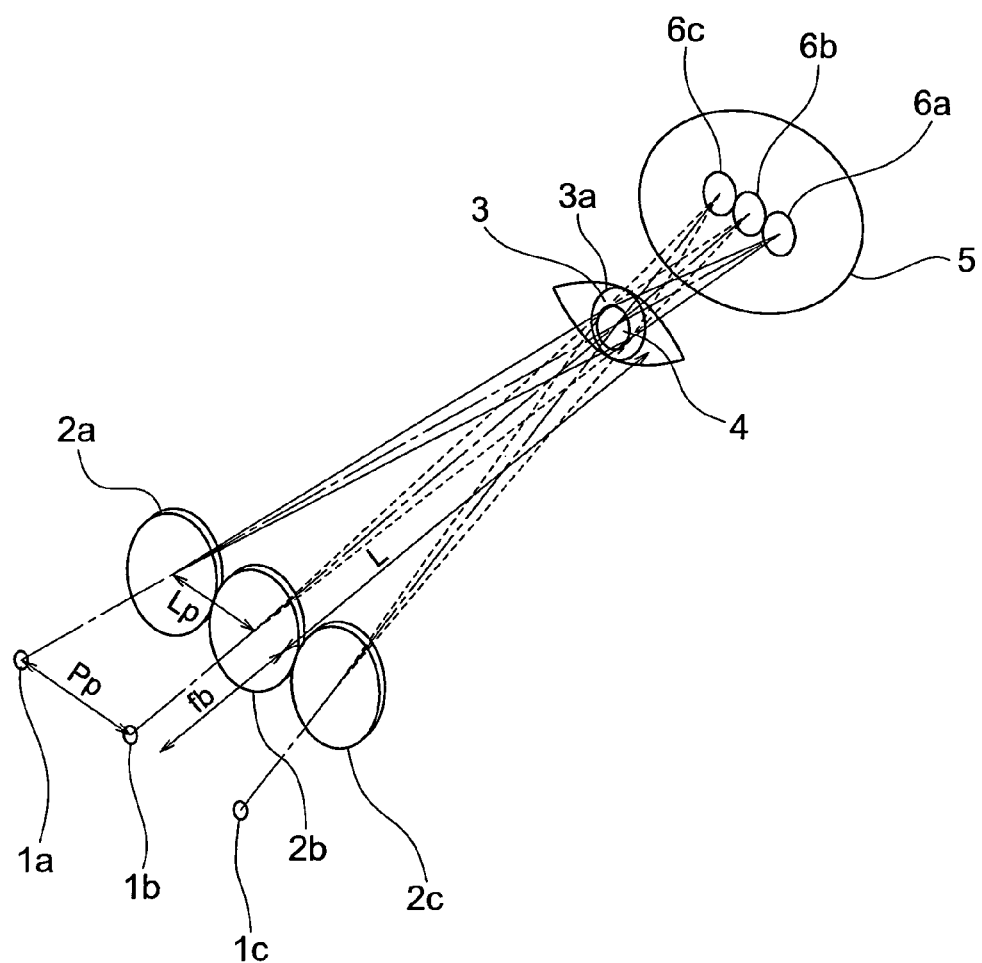
FIG. 1 is a perspective view showing a structure of a display apparatus according to a first embodiment of the present invention.

FIG. 1 shows a display principle of a display apparatus according to embodiments of the present invention. FIG. 1 is a perspective view showing a basic structure of the display apparatus according to the embodiments. In FIG. 1, a lens 3 is a lens of an eye of a person who observes a display (an observer), and an aperture of the lens 3 is a pupil 3a. Light exit point groups 1a, 1b and 1c may include at least one light exit point. In FIG. 1, since each of the light exit point groups 1a, 1b and 1c includes one light exit point, description will be made by calling the light exit point group as a light exit point. The display apparatus includes light exit point groups (light exit points) 1a, 1b and 1c, and lenses 2a, 2b and 2c.

Light emerged from the light exit points 1a, 1b and 1c is projected on the pupil 3a of the lens 3 of the eye of the observer by lenses 2a, 2b and 2c so that images of respective lights are overlapped. When let Pp be the interval (a periodical pitch) of the light exit points 1a, 1b and 1c, let Lp be the interval of the lenses 2a, 2b and 2c, let fb be the distance between the light exit points 1a, 1b and 1c and the lenses 2a, 2b and 2c, and let L be the distance between the lenses 2a, 2b and 2c and the pupil, a relationship in the following expression (1) holds true.

$$Lp/Pp = L/(L+fb) \quad (1)$$

A size 4 of the light exit points 1a, 1b and 1c projected on the pupil 3a is set smaller than a diameter of the pupil 3a. In other words, light beam (the size 4) passing through the pupil 3a is smaller than the pupil 3a.

Moreover, the lenses 2a, 2b and 2c are projected on a retina 5 by the lens 3 of the eye, and their images 6a, 6b and 6c are formed. When the lenses 2a, 2b and 2c are assumed to be pixels, the lens images 6a, 6b and 6c become images of pixels. When a signal of a picture image (i.e. video signal) is imparted to the light exit points 1a, 1b and 1c, it is possible to see the picture image.

In the case of eyes of a farsighted (due to old age) person (a presbyopic person), focus is not on the retina 5. However, since a light beam (the size 4) smaller than the pupil 3a is used for image formation of the lenses 2a, 2b and 2c which are assumed as pixels, an image having a deep depth of focus is formed. Therefore, the observer is able to see a focused picture image easily. This will be described later by using FIG. 3A, FIG. 3B and FIG. 3C.

Figure 2:
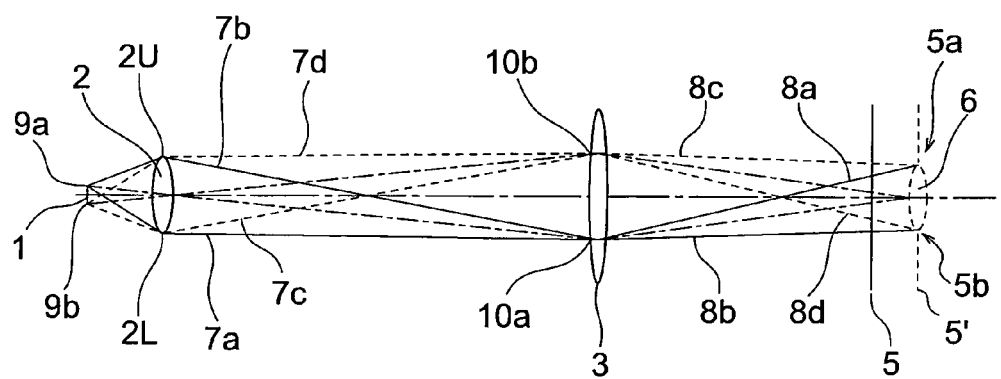
FIG. 2 is a diagram showing a part of an optical system of the display apparatus according to the first embodiment.

Next, each image formation for light exit point 1 and the lens 2 will be described below by using FIG. 2. FIG. 2 is a diagram showing a part of an optical system of the display apparatus having a basic structure. Here, the light exit point 1 is one of the light exit points 1a, 1b and 1c (FIG. 1), and the lens 2 is one of the lenses 2a, 2b and 2c (FIG. 1).

In FIG. 2, the light exit point 1 is shown as a micro area having a finite area. The light exit point 1 is projected on the lens 3 of the eye by the lens 2. Light which has emerged from a point 9a on the light exit point 1 becomes a light beam shown by light beams 7a and 7b (solid lines) after passing through the lens 2. Moreover, an image 10a of the point 9a is formed on the lens 3 of the eye by the light beams 7a and 7b.

At the same time, light which has emerged from a point 9b on the light exit point 1 becomes a light beam shown by light beams 7c and 7d (dashed lines) after passing through the lens 2. That is, an image 10b of the point 9b is formed on the lens 3 of the eye by the light beams 7c and 7d.

On the other hand, the lens 2 is formed as an image in the proximity 5' of the retina 5 by the lens 3 of the eye. Concretely, a point 2U of the lens 2 is formed as an image in the proximity 5a of the retina 5 as shown by light beams 7a, 8a, 7c and 8c. At the same time, a point 2L of the lens 2 is formed as an image in the proximity 5b of the retina 5, as shown by light beams 7b, 8b, 7d and 8d. In this manner, an image 6 of the lens 2 is formed in the proximity 5' of the retina 5.

However, a focal length of the lens 2 is so short that a focal depth of the image 4 of the light exit point group projected on the pupil 3a of the eye of the observer is deep. Therefore, it is in small need that the focusing is accurate on the pupil 3a.

Figure 3A:
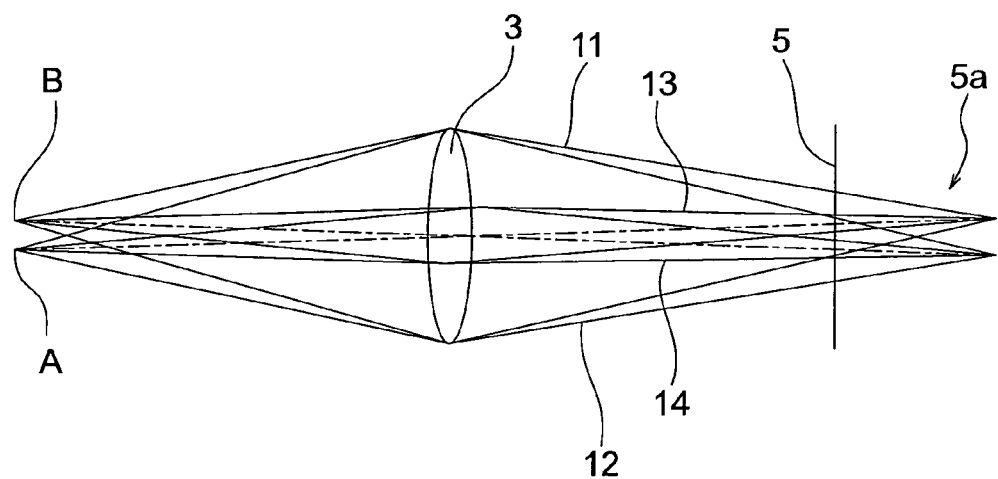
FIG. 3A, FIG. 3B and FIG. 3C show diagrams that compare the image formed by a light beam passed through an entire pupil of an eye with the image formed by a light beams smaller than the pupil.
Figure 3B:
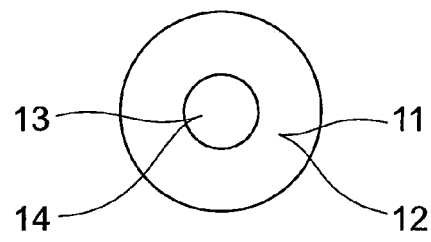
Figure 3C:
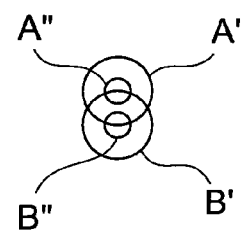

Forming an image (of the size 4) of a light exit point which is smaller than the pupil 3a has an effect equivalent to an effect of narrowing the pupil, and this will be described below by using FIG. 3A, FIG. 3B and FIG. 3C. FIG. 3A, FIG. 3B and FIG. 3C are diagrams comparing the image by a light beam transmitted through the entire pupil 3a of the lens of the eye to the image by a light beams formed by an image of a light exit point smaller than the pupil 3a forms. FIG. 3A is a diagram showing a part of the optical system of the display apparatus having the basic structure, FIG. 3B is a diagram showing an image formed on the retina 5, and FIG. 3C is a diagram showing light beams 11 and 12 on the pupil 3a.

The case in which the observer observes a point A and a point B, is taken into consideration. In the case of farsightedness due to old age, since a refractive power of the lens 3 of the eye is weak, it is not possible to focus on the retina 5. Consequently, since the images of the point A and point B formed by light beams 11 and 12, which have transmitted through the pupil 3a of the lens 3 of the eye, are spread as a circular area A' and a circular area B' on the retina 5, it is not possible to see the images in focus. Besides, since the circular area A' and the circular area B' overlap partially, the observer cannot identify the circular area A' and the circular area B' separately. Consequently, the observer cannot see resolved images.

Whereas, since images of the point A and point B which are formed by light beams 13 and 14 smaller than the pupil 3a become small as a circular area A" and a circular area B" on the retina 5, it is possible to see the images in focus as compared to the circular area A' and the circular area B'. Furthermore, since the circular area A" and the circular area B" do not overlap at all, the observer can identify the circular area A" and the circular area B" separately. In other words, the observer can see resolved images.

A display method according to the embodiments is the method of increasing a depth of field by bringing the pupil 3a in a narrowed state equivalently, by making a light beam thinner than the pupil 3a incident on the pupil 3a.

In a first embodiment described later, the light exit points 1a, 1b and 1c in FIG. 1 are light transmission portions (a color filter 34 as a light exit point) of a black matrix, which will be described by referring to FIG. 8 and FIG. 9.

The light exit point is not necessarily a point, and may be an area having a finite area. Moreover, it is preferable that the light exit point and the light transmission point have a circular shape as in FIG. 1, but may not be necessarily round.

Figure 5:
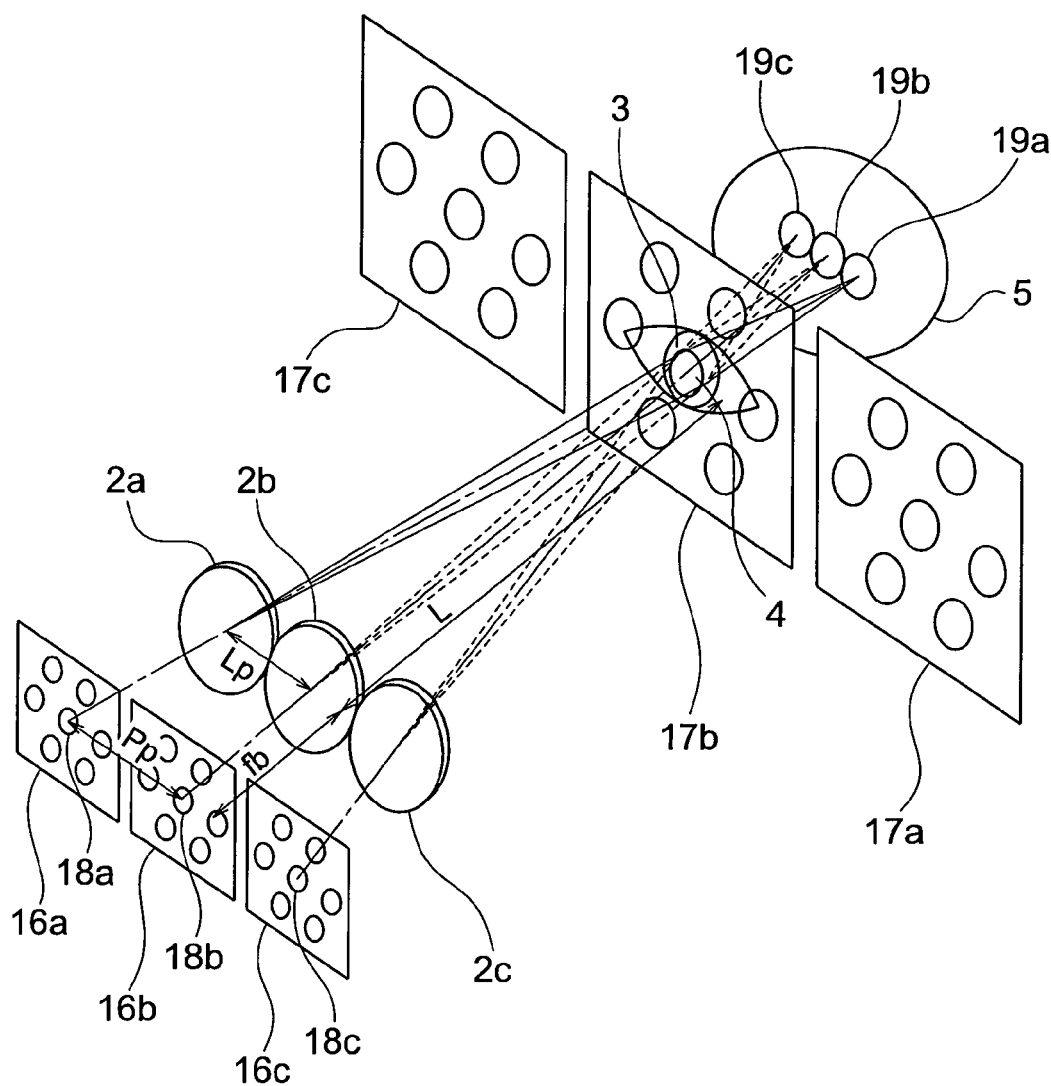
FIG. 5 is a perspective view showing a structure of a display apparatus according to still another pattern of the first embodiment.

In the embodiments, pixels (pixels formed by pixel electrodes) of a normal LCD are called information pixels in order to distinguish themselves from lenses which are the pixels of the embodiment. The information pixels may be associated with the light exit points on one-to-one basis, or a plurality of light exit points may be provided to one information pixel. An example of providing the plurality of light exit points to one information pixel is shown in FIG. 5.

In the normal LCD, sometimes, a color display is carried out by composing one information pixel of sub-information pixels of R (red), G (green) and B (blue). It is possible to have a color display of R, G and B by associating the light exit points 1a, 1b and 1c with sub-information pixels.

In the display apparatus of the embodiments, since the light beam (of size 4) smaller than the diameter of the pupil 3a is made to be incident on the pupil 3a, brightness is reduced by the amount equivalent to the reduction in the diameter of the light beam. For compensating the reduced brightness, it is desirable to increase luminance of the information pixels, for example, to increase luminance (brightness) of a liquid crystal panel. It is desirable to use a LED (light emitting diode) or a LD (laser diode) as a backlight source.

Figure 4:
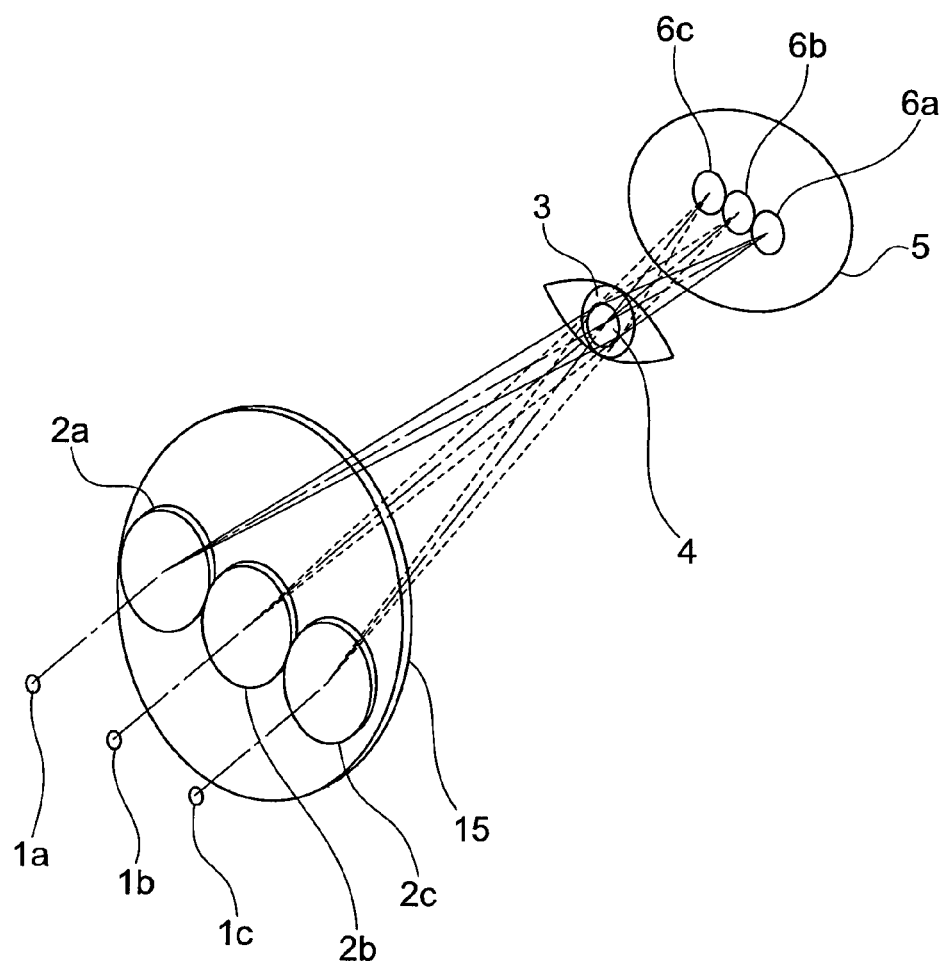
FIG. 4 is a perspective view showing a structure of a display apparatus according to another pattern of the first embodiment.

FIG. 4 is a perspective view showing another basic structure. In FIG. 4, the light exit points 1a, 1b and 1c are disposed at the same interval as the interval of the lenses 2a, 2b and 2c which are pixels. Consequently, lights emerged from the light exit points 1a, 1b and is are projected on the pupil 3a of the lens 3 of the eye of the observer by the lenses 2a, 2b and 2c, but images of the lights are not overlapped. In a pattern shown in FIG. 4, a field lens 15 makes the images of the light exit points 1a, 1b and 1c to be overlapped on the pupil 3a of the lens 3 of the eye. In this manner, in a case of letting the light exit points and the lenses have the same interval, it is necessary to use a field lens.

Next, the case of composing a light exit point group of a plurality of light exit points will be described below by using FIG. 5. FIG. 5 is a perspective view showing another basic structure.

A display apparatus shown in FIG. 5 includes lenses 2a, 2b and 2c which are pixels, and light exit point groups 16a, 16b and 16c. The light exit point groups 16a, 16b and 16c include a plurality of light exit points 18a, 18b and 18c respectively. The light exit point groups 16a, 16b and 16c correspond to information pixels or sub-information pixels. Although the light exit point groups 16a, 16b and 16c seem to be corresponding with the lenses 2a, 2b and 2c respectively on one-to-one basis, when the pupil of the observer is at a position of a light exit point group image 17a, the light exit point groups 16a and 16b correspond to the lenses 2b and 2c. The interval of the lenses is Lp and the interval of the light exit point groups is Pp. The number of light exit points in each light exit point group may be one as mentioned above (FIG. 1 and FIG. 4).

Each of the light exit point groups 16a, 16b and 16c is projected by the lens 2b. Accordingly, light exit point group images 17a, 17b and 17c are formed (FIG. 5).

Moreover, by the lens 2a, the light exit point group 16a is projected at a position of the light exit point group image 17b and the light exit point group 16b is projected at a position of the light exit point group image 17c.

Moreover, by the lens 2c, the light exit point group 16b is projected at a position of the light exit point group image 17a and the light exit point group 16c is projected at the position of the light exit point group image 17b.

Even in the case shown in FIG. 5, images of the light exit points 18a, 18b and 18c are projected to be overlapped on the pupil 3a, by the lenses 2a, 2b and 2c.

Even in this case, when let Pp be the interval of the light exit points 18a, 18b and 18c, let Lp be the interval of the lenses 2a, 2b and 2c, let fb be the distance between the light exit points 18a, 18b and 18c and the lenses 2a, 2b and 2c, and let L be the distance from the lenses 2a, 2b and 2c up to the pupil 3a, a relationship of the following expression (1) holds true.

$$Lp/Pp=L/(L+fb) \tag{1}$$

Moreover, projected images 19a, 19b and 19c of the lenses 2a, 2b and 2c are formed on the retina 5 of the lens 3 of the eye.

When the light exit point groups 16a, 16b and 16c are associated with R (red), G (green) and B (blue) respectively, the observer can see a color image.

In FIG. 5, although the diagram is drawn as if there is a gap between the light exit point groups 16a, 16b and 16c, the gap is drawn for the sake of description and practically there is no gap, which is unnecessary.

Figure 6A:
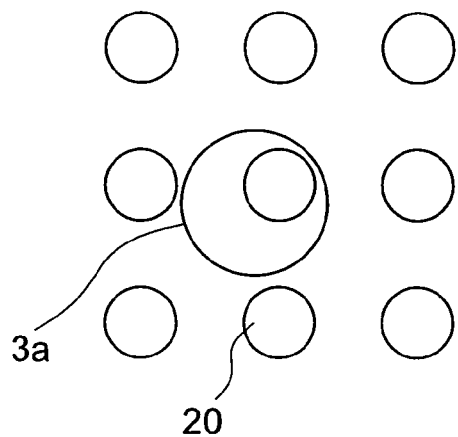
FIG. 6A and FIG. 6B are diagrams showing a state in which a plurality of light exit points is projected on a pupil of an observer.
Figure 6B:
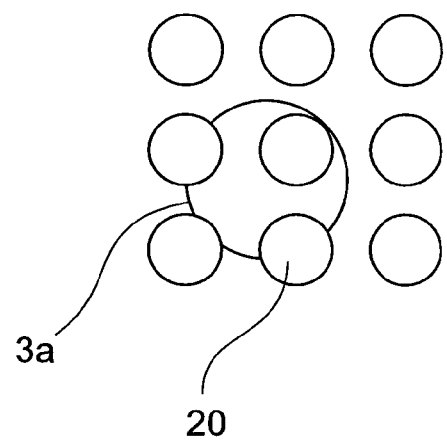

FIG. 6A and FIG. 6B are diagrams showing a state in which the plurality of light exit points is projected on the pupil 3a of the observer. In FIG. 6A and FIG. 6B, the description will be made upon assuming that the light exit point 18a in FIG. 5 has been projected. Moreover, a projected image 20 is an image of the light exit point 18a on the pupil 3a.

As shown in FIG. 6A, when the projected image 20 on the pupil 3a is of an appropriate size with respect to the pupil 3a of the observer's eye, an image of one light exit point (an image of a size smaller than the pupil 3a) is formed on the pupil 3a. In this case, since a light beam smaller than the pupil 3a is incident, there is an effect of increase in the depth of field. In FIG. 6A, the projected image 20 on the pupil 3a of the light exit point corresponds to a size of the light beams 13 and 14 on the pupil 3a in FIG. 3A, FIG. 3B and FIG. 3C, and also corresponds to spreading on the retina 5.

Whereas, when a location and a size of the projected image 20 on the pupil 3a are not appropriate as shown in FIG. 6B, light beams from a plurality of light exit points enter the pupil 3a simultaneously and then the effect of the increase in the depth of field is inhibited. In FIG. 6B, although the number of light beams incident on the pupil (or projected image of light exit points formed on the pupil) is four, the number of beams incident on it perfectly is one and the effect of the increase in the depth of field is not inhibited. Therefore, it is desirable to locate the light exit points such that the number of light beams incident on the pupil 3a is four or less.

When the light exit points are projected, at least one light exit point is projected inside the pupil 3a. For increasing the depth of field, it is desirable that the diameter of a light beam incident on the pupil 3a of the observer, in other words a size of the projected image 20, is smaller than the diameter of the pupil 3a. When the projected image of the light exit point by the lens is smaller than the diameter of the pupil, it takes an effect in which the depth of field is increased. If the diameter of the pupil 3a in a normal brightness is about 3 mm, it is preferable that the diameter of the light beam (size, diameter of the image of the light exit point) is 2.8 mm or less for increasing the depth of field.

Whereas, when the diameter of the light beam from the light exit point becomes small, a resolving power of the eye is degraded.

When let Φ be the diameter of the light beam and let λ be a wavelength, an angular resolving power θ of the eye is calculated by the following expression (2).

$$\theta = \lambda/\Phi \quad (2)$$

Accordingly, the resolving power (a diffraction limit) of 2 mm diameter of a light beam corresponds to almost an eyesight of 1.0 when the wavelength is 0.55 μm. In contrast, if the light beam is narrowed to 1 mm, the eyesight is degraded to 0.5. However, since there is a resolving power of about 0.17 at a point 300 mm from the observer, there is no problem. When the diameter of the light beam is narrowed down to 0.5 mm, the eyesight is degraded down to 0.25. The resolving power 300 mm ahead is degraded to 0.33 mm. With this level, it is somewhat possible to see characters of about 3 mm. However, when the diameter of the light beam is narrowed down to 0.2 mm, the eyesight is degraded to 0.1, and the resolving power 300 mm ahead is degraded to 0.9 mm. Consequently, the diameter of the light beam can be narrowed down to about 0.5 mm at the least.

Sometimes, an intensity distribution of a projected image of a light exit point is not clear due to factors such as diffraction. Moreover, it is also possible to let a brightness distribution of a light exit point to be Gaussian distribution as in laser. When a boundary of a projected image is not clear in such manner, the size of the projected image can be considered to be full width at half maximum equivalently.

A distance at which a farsighted person has a difficulty in seeing an object is a short distance in many cases. Therefore, in order that it is easy to see an object at a distance of about 300 mm, it is preferable to project an image of the light exit point 300 mm ahead assuming the distance up to the observer to be 300 mm. According to an application, even shorter distance may be taken into consideration. For having the effect of increase in the depth of field, it is preferable to set a projected size of the light exit point to about 2.8 mm or less than 2.8 mm.

Since each of the diameter of the lens corresponds to the size of a pixel, 500 μm or smaller is preferable for a highly defined display. Furthermore, the resolving power, when a person having an eyesight of 1.0 sees an object 300 mm away, is approximately 0.1 mm, and it is preferable that the size of the lens (lenses 2a, 2b and 2c) is half of that, which is 0.05 mm, or in other words, about 50 μm. On the other hand, it is necessary to take into consideration, spreading of a light beam due to diffraction as well.

A spreading angle ψ by diffraction, when let D be the size of the aperture (or a diameter or a length of one side), is substantially expressed by the following expression (3).

$$\psi = \lambda/D \quad (3)$$

Then, the size φ of the light beam at distance Z is spread as shown by the following expression (4).

$$\phi = \lambda Z/D \quad (4)$$

Therefore, when D=50 μm, φ is 3.3 mm, and it is revealed that an effect of narrowing the pupil equivalently by the light beam almost ceases. Therefore, it is preferable that the size of the lens is 50 μm or more. Besides, the size of the lens for maintaining the size of the light beam to be 1 mm on the pupil 3a is 165 μm when the distance of observation is 300 mm. Accordingly, it is desirable that the size of the lens is in a range of 50 μm to 500 μm.

First Embodiment

Figure 7:
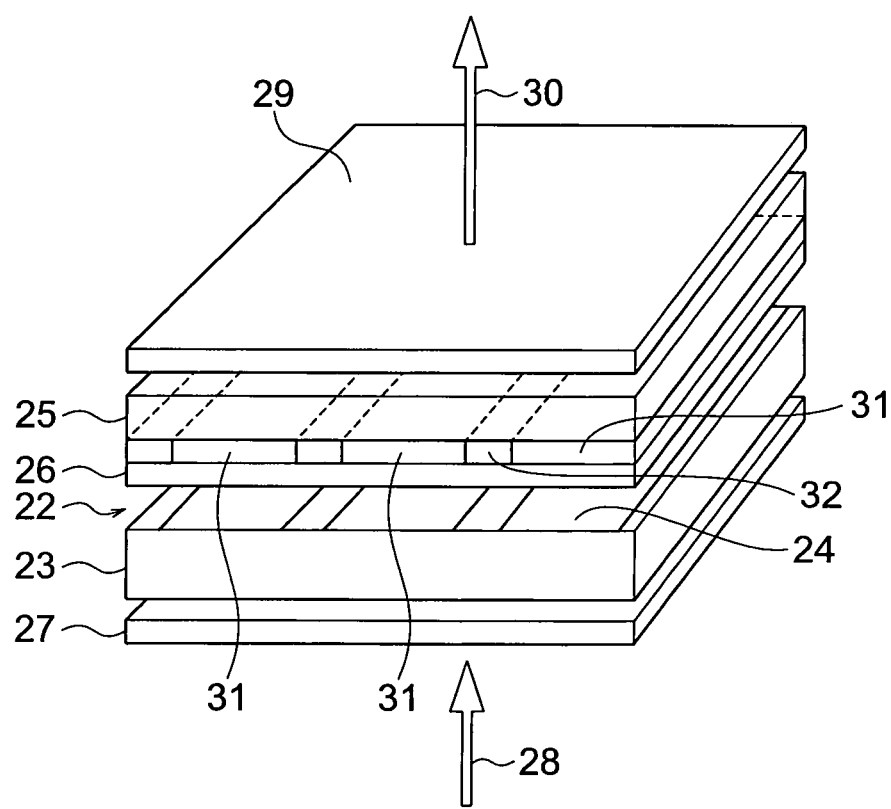
FIG. 7 is a perspective view showing a pixel structure of a liquid crystal display.

A display apparatus according to the first embodiment will be described below. For describing a display apparatus according to the embodiment, a pixel structure of a normal liquid crystal display (LCD) will be described firstly. FIG. 7 is a perspective view showing a structure of an information pixel of the normal liquid crystal display. In the LCD in FIG. 7, a polarizing plate 27, a glass substrate 23, a liquid crystal layer 22, a glass substrate 25 and a polarizing plate 29 are disposed in order from a side of incidence to a side of output.

A pixel electrode 24 which is transparent is composed on a surface of the glass substrate 23, toward the liquid crystal layer 22. A color filter 31 of R (red), G (green) and B (blue), and a common electrode 26 are composed in order on a surface of the glass substrate 25, toward the liquid crystal layer 22, thereby making the color display possible. Consequently, the liquid crystal layer 22 is sandwiched between the transparent pixel electrode 24 provided to the glass substrate 23 and the transparent common electrode 26 provided to the glass substrate 25.

When a voltage corresponding to image information is applied to the pixel electrode 24, an orientation of liquid crystal molecules of the liquid crystal layer 22 changes, and a polarization of a light 28 (backlight) which is incident upon passing through the polarizing plate 27 changes, and an amount of light 30 transmitted through the polarizing plate 29 changes.

Moreover, the glass substrate 25 is provided with a black matrix 32 for improving a contrast. In the color filter 31, for preventing mixing of colors, a colorless portion is provided between filters of different colors, and these portions compose the black matrix 32. Since the color filters 31 of R, G and B are not in contact with each other because of the presence of the black matrix 32, it is possible to prevent mixing of colors.

The black matrix 32 is also useful for preventing light leakage at the time of black display, in addition to preventing mixing of colors. Moreover, the black matrix 32 has a function of preventing a leakage of current from a TFT (thin film transistor) not shown in the diagram, which drives the pixel electrodes.

Figure 8:
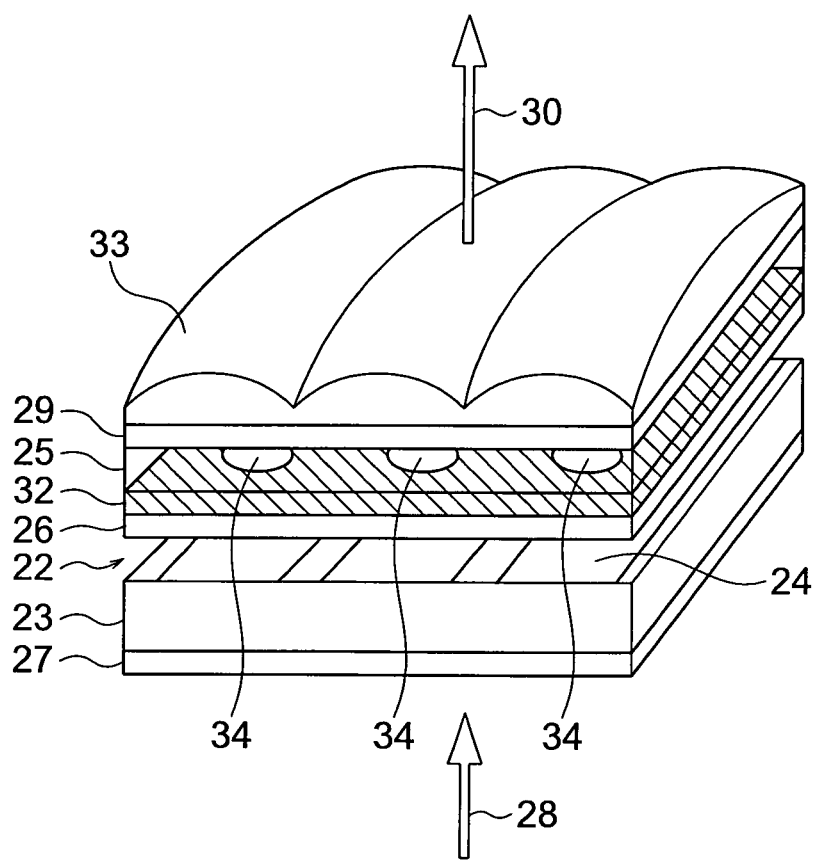
FIG. 8 is an exploded perspective view showing a pixel structure of the first embodiment.
Figure 9:
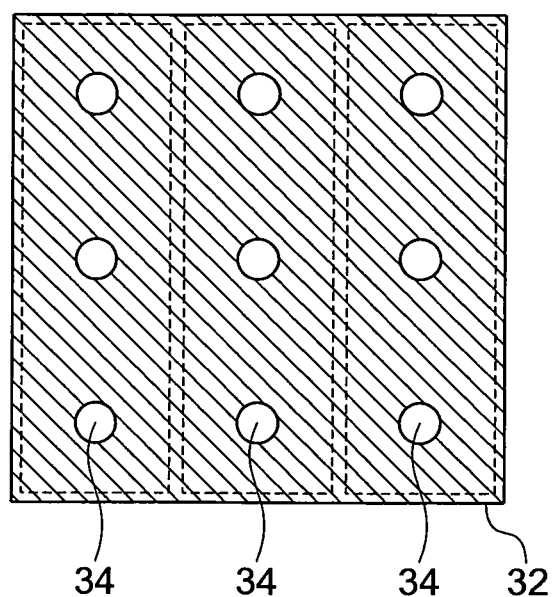
FIG. 9 is a plan view showing a structure of a black matrix of the first embodiment.
Figure 10:
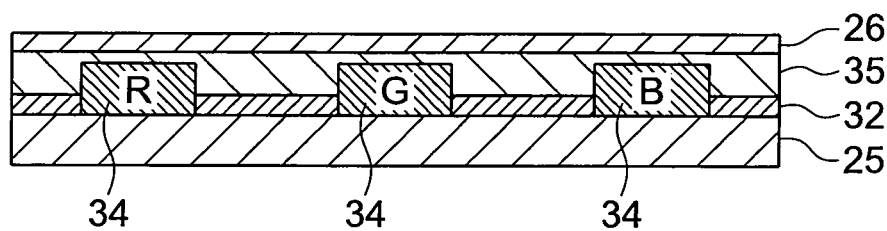
FIG. 10 is a cross-sectional view showing a structure of light exit points provided for the black matrix of the first embodiment.

FIG. 8 is an exploded perspective view showing a structure of an information pixel in the display apparatus according to the first embodiment. FIG. 9 is a plan view showing a structure of a black matrix. FIG. 10 is a cross-sectional view showing a structure of the color filter 34 provided as a light exit point to the black matrix 32.

As shown in FIG. 8, the information pixel in the display apparatus according to the first embodiment, similarly as the liquid crystal display shown in FIG. 7, includes the polarizing plate 27, the glass substrate 23, the liquid crystal layer 22, the glass substrate 25 and the polarizing plate 29, which are disposed in the abovementioned order from a side of incidence of light to an output side of light.

As shown in FIG. 10, in the information pixel of the first embodiment, the black matrix 32 and the color filter 34 which becomes the light exit point are provided on the glass substrate 25. The black matrix 32 and the color filter 34 are protected by a protective layer 35, and the common electrode 26 is provided on the protective layer 35.

As a material of the black matrix 32, a material such as a resin material which includes chromium or carbon black is used. The black matrix 32 may have a color other than black, if it is thin and has a superior light shielding property.

Moreover, lenses of a micro lens array 33 are provided at an output side of the polarizing plate 29. Each lens of the micro lens array 33 corresponds to a sub-information pixel, and each lens is disposed corresponding to the pixel electrode 24.

An order of R, G and B of the color filter 34 is not restricted to an order shown in FIG. 10, and R, G and B of the color filter 34 may be disposed in a different order.

Moreover, in a case of using an effect of a field lens, a combined micro lens array which is imparted an effect of the field lens is used instead of the micro lens array 33.

Figure 11A:
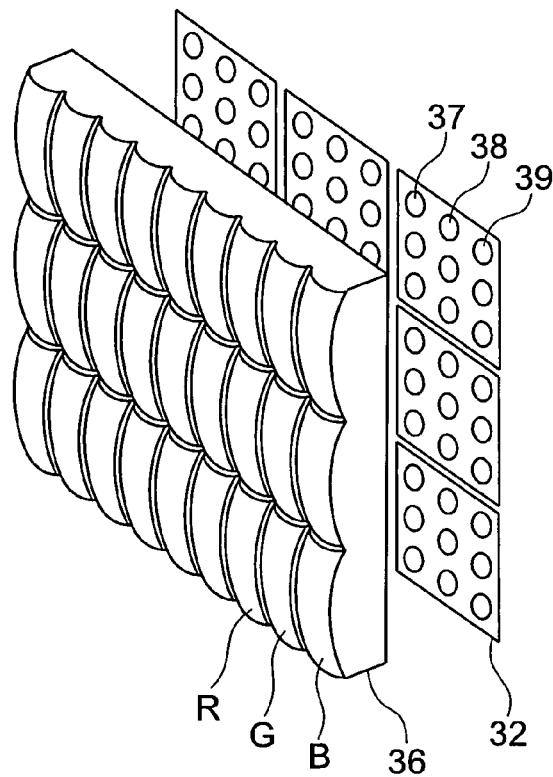
FIG. 11A is a perspective view showing a combined micro lens array and a black matrix corresponding to a plurality of pixels.
Figure 11B:
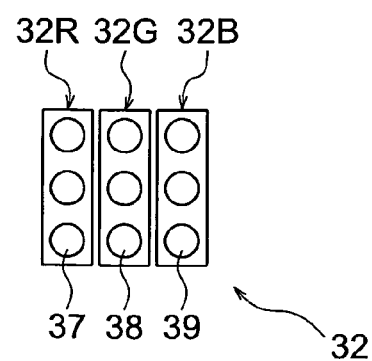
FIG. 11B is a plan view showing a structure of light exit point groups in FIG. 11A.

FIG. 11A is a perspective view showing the black matrix 32 and a combined micro lens array 36, and FIG. 11B is a plan view showing an arrangement of light exit point groups of the black matrix 32. In FIG. 11A and FIG. 11B, details of the pixel structure are omitted. Although, in FIG. 11A and FIG. 11B, the diagram is drawn as if there is a gap between the light exit point groups of the black matrix 32 for convenience of explanation, there is no unnecessary gap in a practical arrangement.

In an example shown in FIG. 11A and FIG. 11B, an interval of the sub-information pixels (an interval of the light exit points on the black matrix 32) and an interval of the combined micro lens array 36 are set to be the same. The information pixel of the black matrix 32 includes sub-information pixels 32R, 32G and 32B (FIG. 11B). Each of the sub-information pixels 32R, 32G and 32B is rectangular-shaped, and corresponds to R, G and B respectively. Such arrangement corresponds to an arrangement of colors in a color display of a stripe type. At least one light exit point 37, 38 and 39 has been provided in the sub-information pixels 32R, 32G and 32B respectively. In the first embodiment, three light exit points are provided to each sub-information pixel. Moreover, an arrangement of the light exit points 37, 38 and 39 is same in all the sub-information pixels. By such an arrangement, the sub-information pixels compose a new light exit point group.

If the interval of the sub-information pixels and the interval of the lenses are set to satisfy the above-mentioned expression (1), the field lens effect becomes unnecessary, and a micro lens array is used instead of the combined micro lens array 36.

The information pixel has a square shape in a large number of cases, and the rectangular-shaped sub information pixels of R, G and B have a horizontal width ⅓ times of a vertical width.

For instance, when an information pixel of 180 μm square is used, the size of a rectangular-shaped lens corresponding to the sub-information pixel is 60 μm×180 μm. A diameter of a light beam of a light exit point projected by the rectangular-shaped lens is spread by diffraction, and is 2.75 mm approximately. The spread diameter being smaller than the pupil diameter of 3 mm of a normal eye, there is an effect of increase in the depth of field.

For improving a color reproducibility, one more color to R, G and B may be added.

Numerical examples of the first embodiment will be shown below.

Lenses in the numerical examples indicate lenses 2a, 2b and 2c in cases of FIG. 1, FIG. 4 and FIG. 5, and indicate the combined micro lens array 36 in cases of FIG. 11A and FIG. 11B.

When let L be a distance up to the observer, and let m be a projection magnification by the lens, a distance fb between the lens and the light exit point satisfies fb=L/m, and a focal length F of the lens satisfies F=fb L/(L+fb).

Here, an ideal case in which a distance from the lens up to the lens of the eye, or in other words, a distance up to the observer is same as a distance L from the lens up to the image of the light exit point group has been assumed.

If the size of the light exit point is 2 μm, for making a projected image of 1 mm incident on the pupil of the observer, it is necessary that the projection magnification of the lens is 500 times. If the distance up to the observer is 300 mm, the focal length of the lens is 0.599 mm. The light exit point is placed at a rear focal point position 0.6 mm. In a case of projecting 300 mm ahead due to the focal length of the lens being small, projection is almost same as an infinite projection. If an interval between the nearest light exit points is 6 μm, the interval is 3 mm at a position of the observer. If the pupil is moved 3 mm, an image is seen by a light beam by a projected image of an adjacent light exit point.

In other words, in a case in which a focal length of the lens 2 is short, there is a case which is equivalent to a case of projecting the pupil infinitely. In this case, it is assumed that an aperture group is set at infinity seen from the observer, therefore even when a diameter of light beam entering the pupil is not smaller than the diameter of the pupil, the observer can see an image which is focused.

If the size of the light exit point is 5 μm, for making a projected image of 1.5 mm incident on the pupil of the observer, it is necessary that the projection magnification of the lens is 300 times. If the distance up to the observer is 300 mm, the focal length of the lens is 0.997 mm. The light exit point is placed at the rear focal point position 1.0 mm. If an interval between the nearest light exit points is 10 μm, the interval is 3 mm at the position of the observer. If the pupil is moved 3 mm, an image is seen by a light beam by a projected image of the adjacent light exit point.

If the size of the light exit point is 10 μm, for making a projected image of 2 mm incident on the pupil of the observer, it is necessary that the projection magnification of the lens is 200 times. If the distance up to the observer is 300 mm, the focal length of the lens is 1.49 mm. The light exit point is placed at the rear focal point position 1.5 mm. If the interval between the nearest light exit points is 15 μm, the interval is 3 mm at the position of the observer. If the pupil is moved 3 mm, an image is seen by a light beam by a projected image of the adjacent light exit point.

If the size of the light exit point is 15 μm, for making a projected image of 1.5 mm incident on the pupil of the observer, it is necessary that the projection magnification of the lens is 100 times. If the distance up to the observer is 300 mm, the focal length of the lens is 2.97 mm. The light exit point is placed at the rear focal point position 3.0 mm. When the interval between the nearest light exit points is 30 μm, the interval is 3 mm at the position of the observer. If the pupil is moved 3 mm, an image is seen by a light beam by a projected image of the adjacent light exit point.

If the size of the light exit point is 10 μm, for making a projected image of 1.25 mm incident on the pupil of the observer, it is necessary that the projection magnification of the lens is 125 times. If the distance up to the observer is 250 mm, the focal length of the lens is 1.98 mm. The light exit point is placed at the rear focal point position 2.0 mm.

If the size of the light exit point is 20 μm, for making a projected image of 1 mm incident on the pupil of the observer, it is necessary that the projection magnification of the lens is 50 times. If the distance up to the observer is 300 mm, the focal length of the lens is 5.88 mm. The light exit point is placed at the rear focal point position 6.0 mm.

The display apparatus according to the first embodiment, and an electronic equipment, a mobile electronic equipment, a mobile telephone and an image pickup apparatus, which include the display apparatus, have an effect that a focal depth of the eye is increased by making a light beam incident on the pupil of the observer smaller than the diameter of the pupil. As a result, it is possible to increase the depth of field, and even a person who is not capable of focusing at a display position is able to see a focused display.

According to the display apparatus according to the first embodiment, and the electronic equipment, the mobile electronic equipment, the mobile telephone and the image pickup apparatus, which include the display apparatus, even a farsighted person due to old age is able to see a focused display without putting on or taking off reading glasses. Furthermore, a load on eyes of a farsighted observer due to old age is reduced, and it is possible to observe without using reading glasses or any other optical member. Consequently, even a farsighted person due to old age is capable of seeing without putting on or taking off reading glasses, a focused display of a mobile equipment such as a mobile telephone, a digital camera, and an electronic book, and monitor screens such as a car navigation system and a personal computer, in which the display apparatus according to the first embodiment is used. Furthermore, even a farsighted person or a nearsighted person is able to see a focused image including any information which is displayed, such as pictures and characters, without using glasses. Therefore, even a farsighted person due to old age, a nearsighted person, or an astigmatic person, who has a difficulty in seeing a display with a normal electronic equipment is able to recognize display contents by a focused display, and to operate the equipment accurately.

Second Embodiment

With recent improvement for high definition LCD, the size of one side of the information pixel is about 90 μm. In this case, the sub-information pixel has a rectangular shape of 30 μm×90 μm. If a lens is made smaller corresponding to such sub-information pixel, a problem that a projected image of a diameter smaller than the pupil of the eye cannot be formed arises due to spreading caused by diffraction of a projected image of the light exit point.

Figure 12:
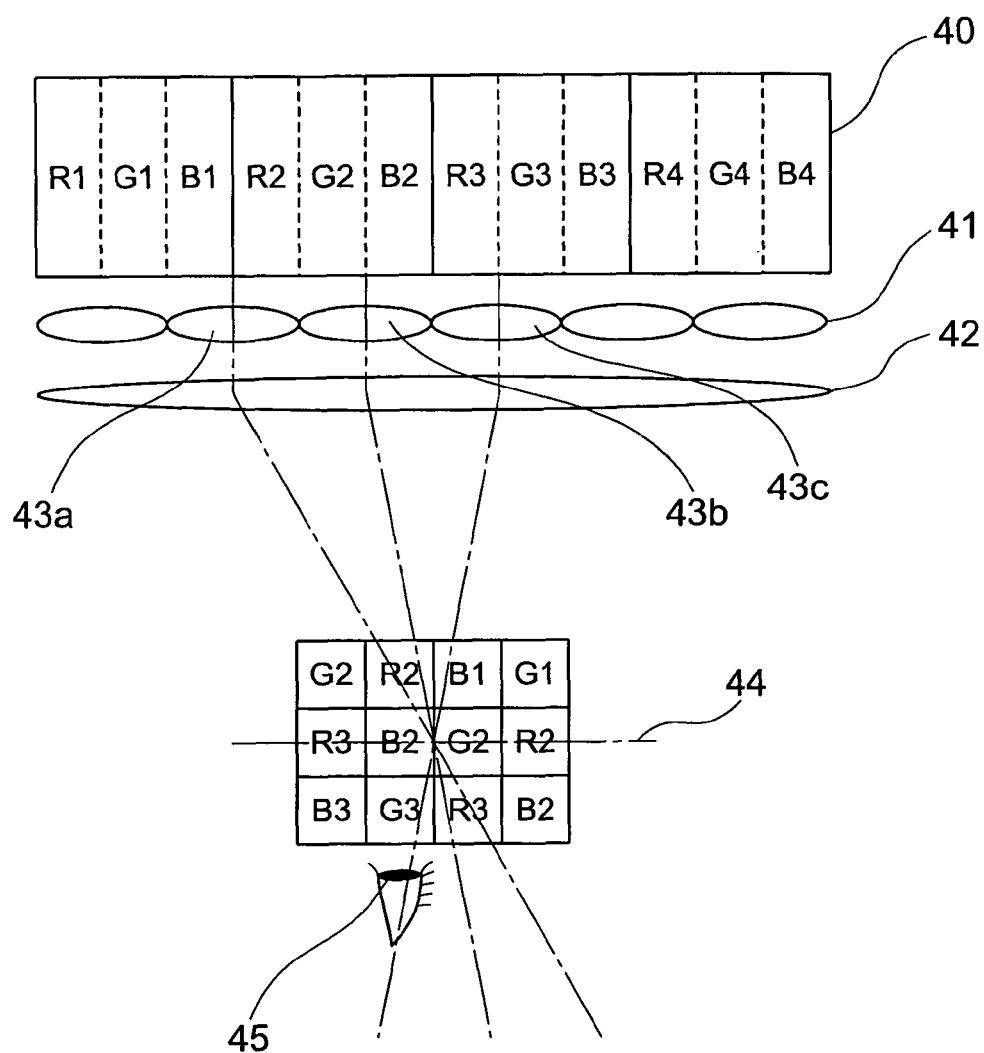
FIG. 12 is a diagram showing a structure of a display apparatus according to a second embodiment of the present invention.
Figure 13:
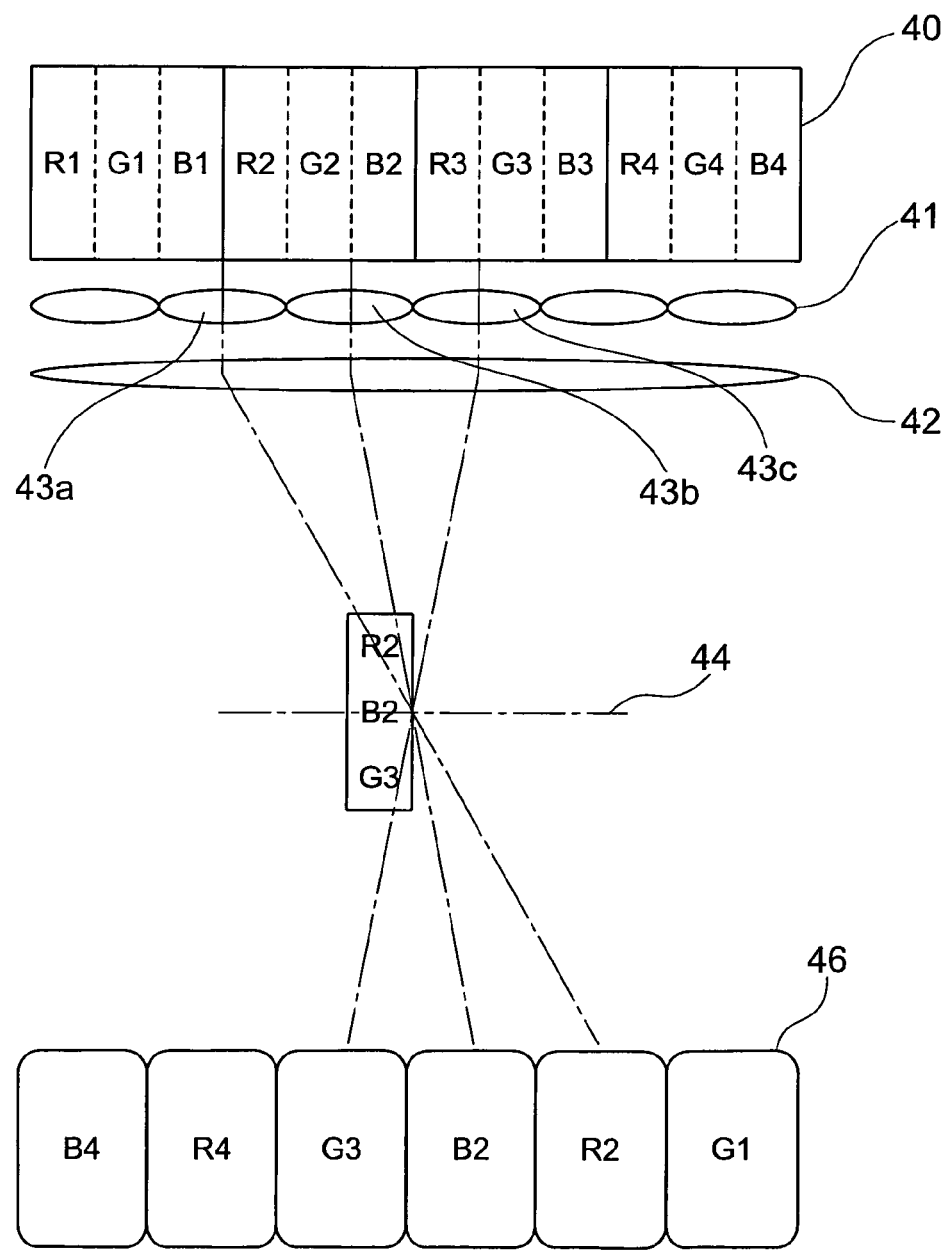
FIG. 13 is a diagram showing the display apparatus according to the second embodiment, and a picture image which is observed by the display apparatus according to the second embodiment.

As a solution to this problem, FIG. 12 shows an example in which an information pixel consists of two sub-information pixels is associated with one lens. FIG. 12 is a diagram showing a structure of a display apparatus according to a second embodiment. FIG. 13 is a diagram showing the display apparatus according to the second embodiment, and an image which is observed by the display apparatus according to the second embodiment.

An information pixel 40 of a liquid crystal display includes sub-information pixels having a rectangular shape. Each of the sub-information pixels is assigned one of R, G and B colors, and the sub-information pixels are arranged in order of R1, G1, B1, R2, G2, B2, R3, G3, B3, R4, G4 and B4. In this case, the order of R, G and B of the sub-information pixels is repeated, but it may be a repetition of an order other than R, G and B of the sub-information pixels. At least one light exit point is provided on these sub-information pixels. Moreover, the size and shape of the lens are the same size and shape of the combined two sub-information pixels which compose the information pixel.

The light exit point is a color filter provided to the black matrix as it has already been mentioned.

In the display apparatus according to the second embodiment, two adjacent sub-information pixels B1 and R2 compose one information pixel, and this information pixel composes one light exit point group. Moreover, one lens 43a is disposed at a position facing this information pixel. Similarly, sub-information pixels G2 and B2 correspond to a lens 43b, and sub-information pixels R3 and G3 correspond to a lens 43c. The correspondence other than this is as shown in FIG. 12.

Practically, a larger number of sub-information pixels are arranged in rows two-dimensionally.

In the display apparatus according to the second embodiment, an image of a light exit point is projected in the proximity 44 of a pupil 45 of an eye by a field lens 42 and a micro lens array 41 including lenses 43a, 43b and 43c. Projected images R3, B2, G2 and R2 by the lens 43b and projected images B3, G3, R3 and B2 by the lens 43c are formed corresponding to positions of projected images G2, R2, B1 and G1 by the lens 43a. In other words, the projected images are formed with overlapping the images of the sub-information pixels in original arrangement shifted by two sub-information pixels.

Here, although the description has been made in terms of units of sub-information pixels, practically, the projected images are formed with overlapping the arrangement for each color shifted by two in unit of light exit point in the sub-information pixel. By overlapping the projected images of the light exit points shifted by two, R, G and B are overlapped in one projected image. A light exit point group consists of two sub-information pixels, which are of different colors and overlapped in the projected image, is associated with a lens. Consequently, even if a projected image of any light exit point is incident on the pupil, light beams of R, G and B can be incident on the pupil and a color image can be seen. For instance, when the projected images of the light exit points projected on the pupil 45 of the eye are R2, B2 and G3, an image 46 shown in FIG. 13 is observed on the retina.

As it has been mentioned above, the pixel observed on the retina is a lens. In FIG. 13, light beams from the sub-information pixels R2, B2 and G3, more elaborately light exit points, pass through the lenses 43a, 43b and 43c. Therefore, when the lenses 43a, 43b and 43c are formed as images on the retina, images of R, G and B are formed. In other words, the observer can see a color image of R, G and B.

For instance, if the size of one side of the information pixel of a high-definition LCD is 90 μm, the sub-information pixel of R, G and B is 30 μm×90 μm. But combining two sub-information pixels, a combined pixel has the size of 60 μm×90 μm. A lens corresponding to the combined pixel is rectangular-shaped, having a size 60 μm×90 μm. Since an aperture diameter of the lens has increased, the spreading due to diffraction is suppressed to 2.75 mm.

In the display apparatus according to the second embodiment, although the number of pixels which can be observed is reduced to half, there is no decrease in brightness because the diameter of the lens does not become small. Moreover, it is preferable to use a combined micro lens array in which an effect of a field lens is imparted to the micro lens array 41.

Accordingly, without changing the arrangement of R, G and B of the existing FPD, it is possible to suppress spreading of a projected image of the light exit point due to diffraction, and to maintain an effect of the depth of field. In other words, it is possible to use the existing FPD as an information pixel.

Furthermore, other structure, operation, and effect of the present embodiment are common in the first embodiment.

Third Embodiment

Figure 14:
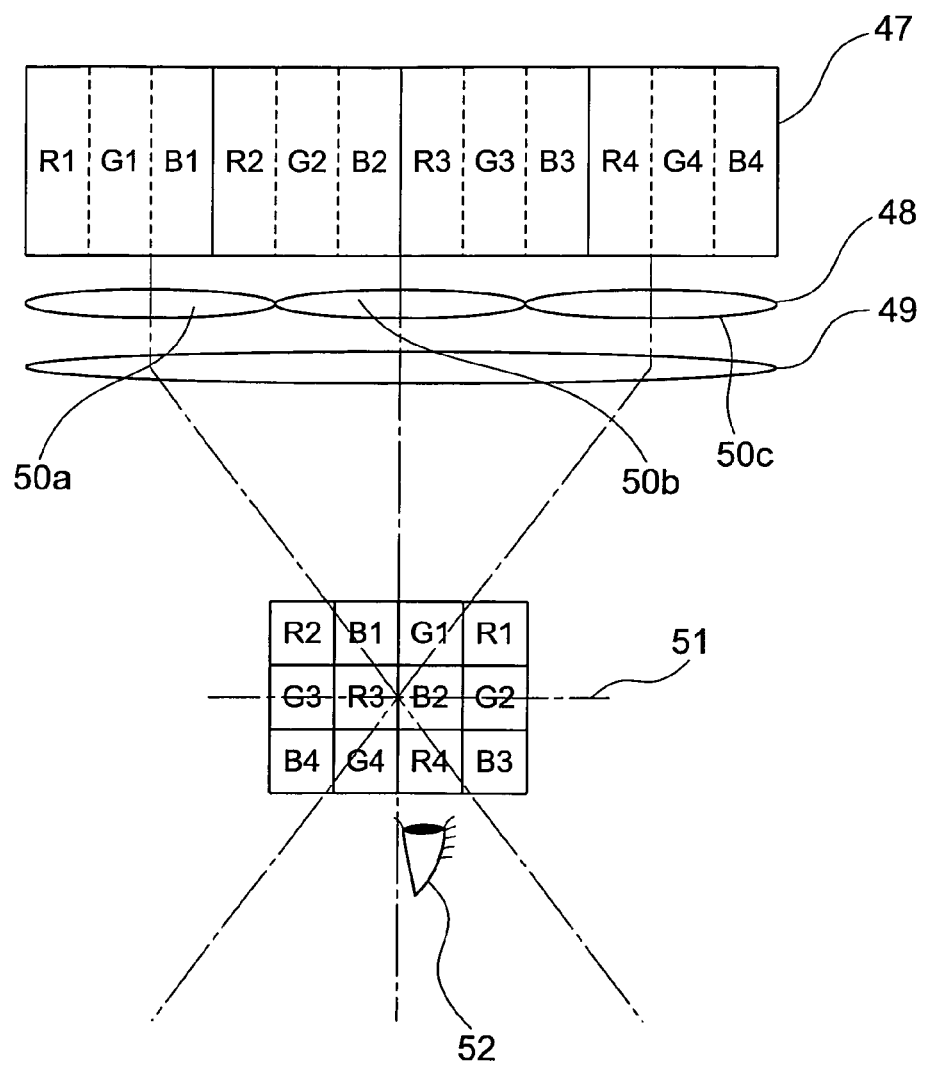
FIG. 14 is a diagram showing a structure of a display apparatus according to a third embodiment of the present invention.
Figure 15:
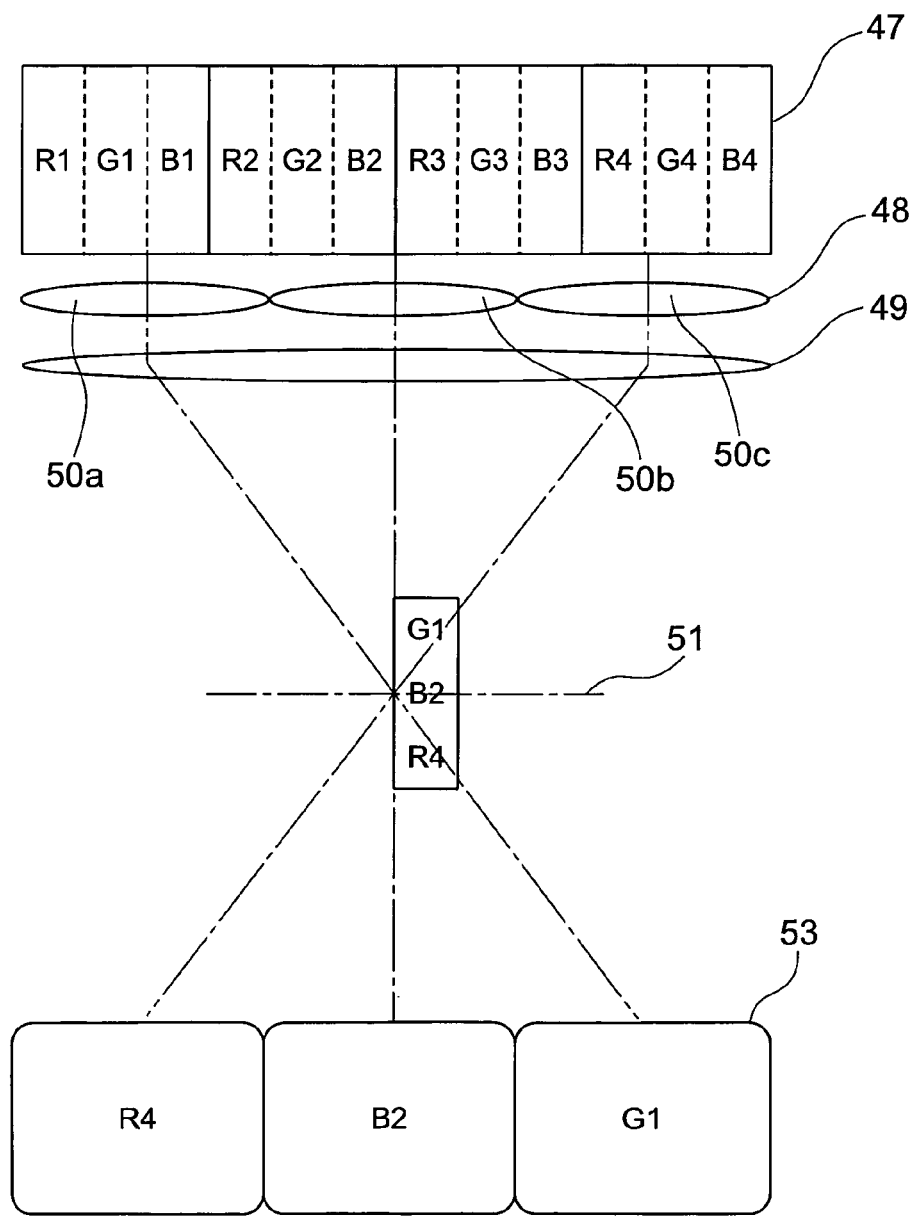
FIG. 15 is a diagram showing the display apparatus according to the third embodiment, and a picture image which is observed by the display apparatus according to the third embodiment.

FIG. 14 is a diagram showing a structure of a display apparatus according to a third embodiment of the present invention. FIG. 15 is a diagram showing the display apparatus according to the third embodiment, and an image which is observed by the display apparatus according to the third embodiment.

In FIG. 14, an example in which an information pixel consists of four sub-information pixels and is associated with a lens, is shown.

An information pixel 47 of a liquid crystal display consists of sub-information pixels having a rectangular shape. R, G and B colors are assigned to the sub-information pixels respectively, and the sub-information pixels are arranged in order of R1, G1, B1, R2, G2, B2, R3, G3, B3, R4, G4 and B4. At least one light exit point is provided on these sub-information pixels. Moreover, the size and shape of the lens are the same size and shape of the combined four sub-information pixels which compose the information pixel.

The light exit point is a color filter provided to the black matrix, as it has already been mentioned.

In the display apparatus according to the third embodiment, a light exit point group is composed of the information pixel which consists of four sub-information pixels R1, G1, B1 and R2. Moreover, a lens 50a is disposed at a position facing the information pixel. Similarly, the sub-information pixels G2, B2, R3 and G3 correspond to a lens 50b, and sub-information pixels B3, R4, G4 and B4 correspond to a lens 50c. In the information pixel 47, practically, a large number of sub-information pixels are arranged in rows two-dimensionally.

Images of the light exit points are projected in the proximity 51 of a pupil 52 of an eye by a field lens 49 and a micro lens array 48 including the lenses 50a, 50b and 50c. Corresponding to positions of projected images R2, B1, G1 and R1 by the lens 50a, projected images G3, R3, B2 and G2 are formed by the lens 50b, and projected images B4, G4, R4 and B3 are formed by the lens 50c. In other words, the projected images are formed with overlapping the images of the sub-information pixels in original arrangement shifted by four sub-information pixels. Here, although the description has been made in terms of units of sub-information pixels, practically, the projected images are formed with overlapping the arrangement for each color shifted by two in unit of light exit point. By overlapping the projected images of the light exit points shifted by four, R, G and B are overlapped on one projected image. A light exit point group is composed of four sub-information pixels such that the sub-information pixels of different colors are overlapped in the projected image, and the light exit point group is associated with one lens. Consequently, even if a projected image of any light exit point is incident on the pupil, light beam of R, G and B can be incident on the pupil and a color image can be seen. For instance, if the projected images of the light exit points projected on the pupil 52 of the eye are G1, B2 and R4, an image 53 shown in FIG. 15 is observed on the retina.

As mentioned above, a pixel which is observed on the retina is a lens. In FIG. 15, light beams from the sub-information pixels G1, B2 and R4, more elaborately light exit points, pass through the lenses 50a, 50b and 50c respectively. Therefore, if the lenses 50a, 50b and 50c are formed as images on the retina, image of R, G and B are formed thereon. In other words, the observer can see a color image of R, G and B.

For instance, if the size of one side of the information pixel of a high-definition LCD is 90 μm, the sub-information pixel of R, G and B is 30 μm×90 μm. And a combined pixel of 120 μm×90 μm is obtained by combining four sub-information pixels. A lens corresponding to the combined pixel is a rectangular-shaped lens of size 120 μm×90 μm. Since an aperture diameter of the lens is large, spreading due to diffraction is suppressed to 1.4 mm.

The number of pixels for which the observer can observe is reduced to one fourth. However, since the diameter of the lens does not decrease, brightness is not reduced. Moreover, a combined micro lens array in which an effect of the field lens 49 is imparted to the micro lens array 48 may be used.

Furthermore, other structure, operation, and effect of the present embodiment are common in the above-mentioned embodiments.

Figure 16:
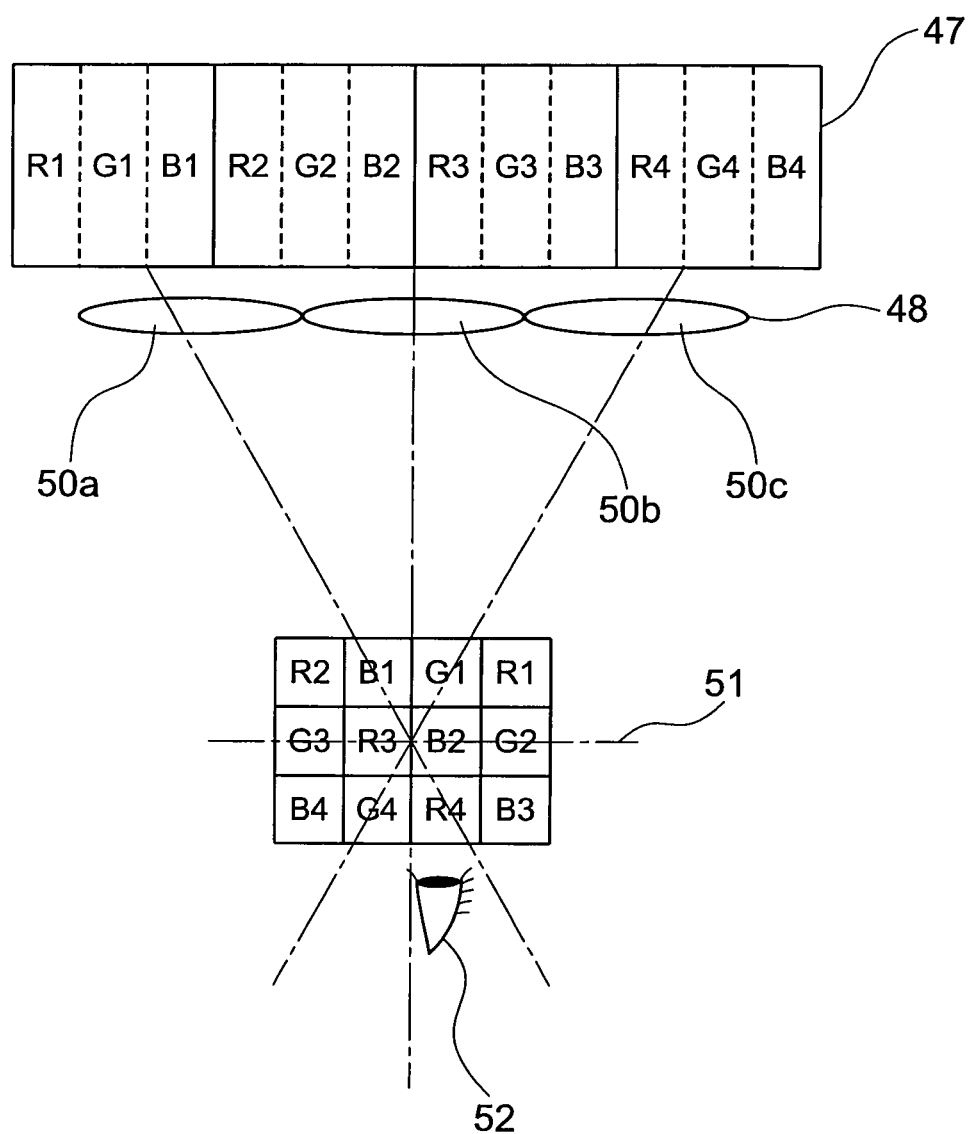
FIG. 16 is a diagram showing a structure of a display apparatus according to another pattern of the third embodiment.

FIG. 16 is a diagram showing a structure of a display apparatus according to another pattern of the third embodiment. The pattern shown in FIG. 16 is a case in which the field lens 49 is not used for the display apparatus in FIG. 14 and FIG. 15. This is an example in which the information pixel 47 consists of four sub-information pixels and one of the lenses 50a, 50b and 50c is associated with the information pixel 47 for the display apparatus shown in FIG. 1.

An operation and an effect by this display apparatus being similar to the operation and the effect of the display apparatus according to the third embodiment shown in FIG. 15, the description thereof is omitted.

Fourth Embodiment

Figure 17:
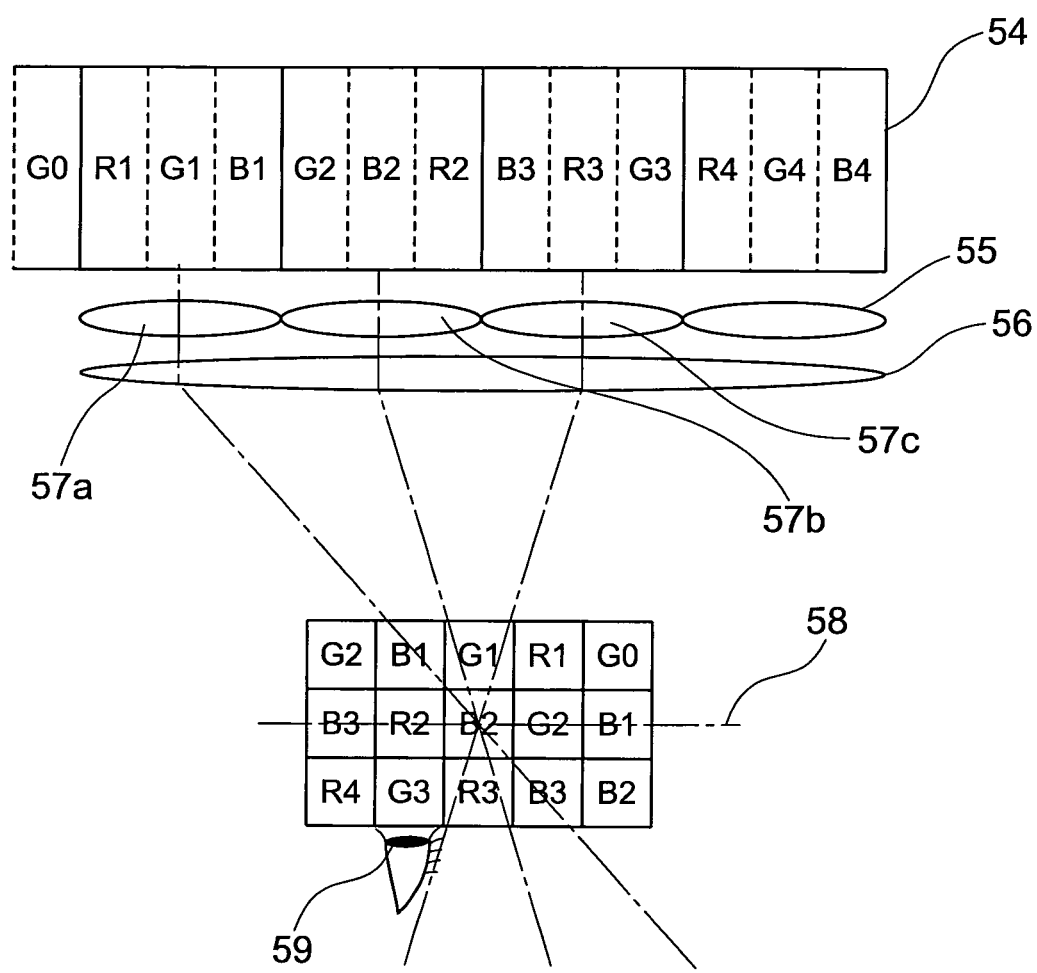
FIG. 17 is a diagram showing a structure of a display apparatus according to a fourth embodiment of the present invention.
Figure 18:
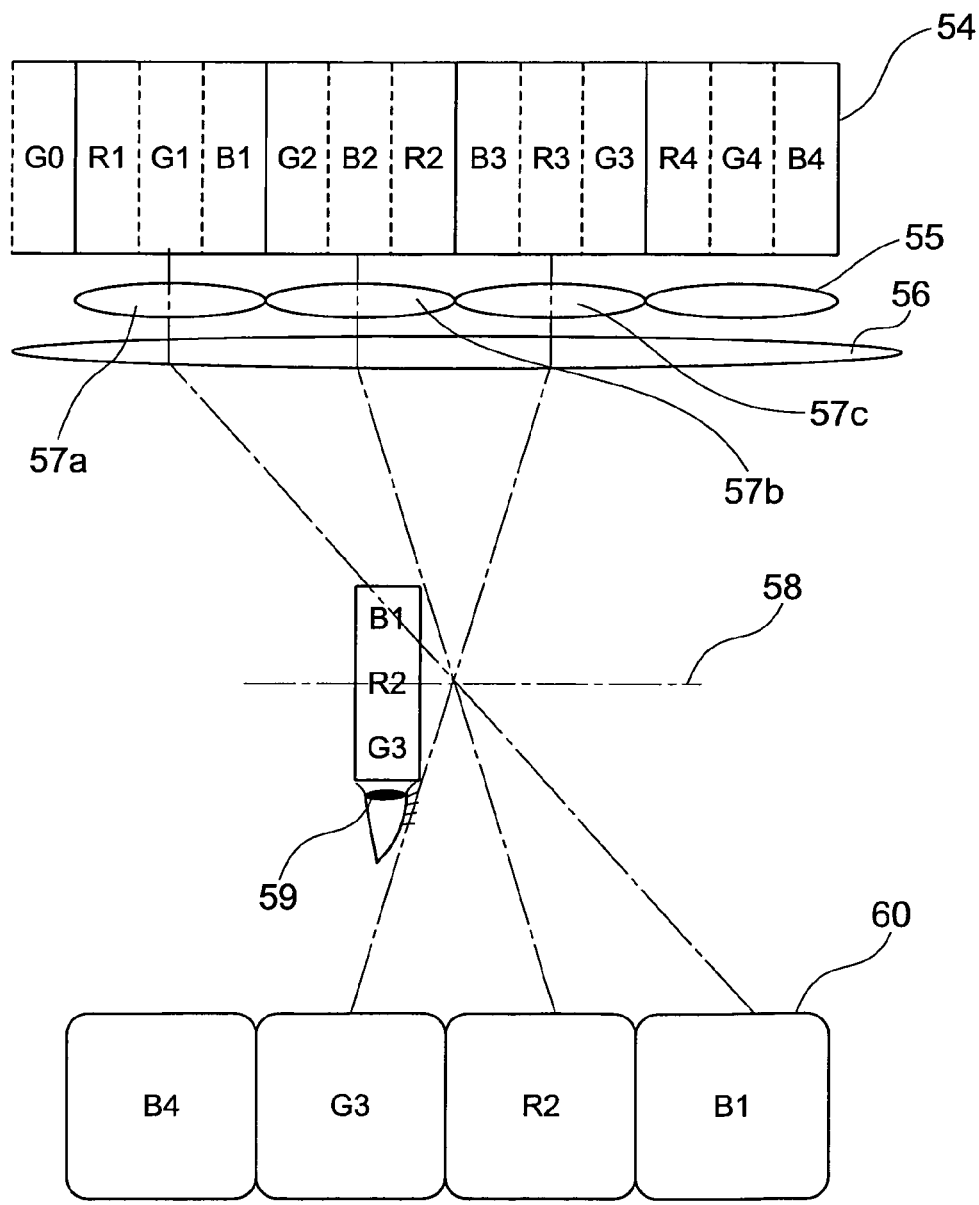
FIG. 18 is a diagram showing the display apparatus according to the fourth embodiment, and a picture image which is observed by the display apparatus according to the fourth embodiment.

FIG. 17 is a diagram showing a structure of a display apparatus according to a fourth embodiment of the present invention. FIG. 18 is a diagram showing the display apparatus and an image observed by the display apparatus according to the fourth embodiment.

An example in which an information pixel consists of three sub-information pixels and one lens is associated with this information pixel is shown in FIG. 17.

An information pixel 54 of an LCD consists of sub-information pixels having a rectangular shape. R, G and B colors are assigned to the sub-information pixels respectively, and the sub-information pixels are arranged in order of G0, R1, G1, B1, G2, B2, R2, B3, R3, G3, R4, G4 and B4. In other words, the arrangement of the sub-information pixels of the adjacent image pixels is in different order. At least one light exit point is provided to these sub-information pixels. Moreover, the size and shape of the lens are the same as those of the information pixel that consists of the three sub-information pixels.

The light exit point is a color filter provided to the black matrix, as mentioned above.

In the display apparatus according to the fourth embodiment, one information pixel consists of three sub-information pixels R1, G1 and B1, and one light exit point group consists of the information pixel. Moreover, a lens 57a is disposed at a position corresponding to the information pixel. Similarly, the sub-information pixels G2, B2 and R2 correspond to a lens 57b, and sub-information pixels B3, R3 and G3 correspond to a lens 57c. Practically, a larger number of sub-information pixels are arranged in rows two-dimensionally.

Images of the light exit points are projected in the proximity 58 of a pupil 59 of an eye by a field lens 57 and a micro lens array 55 including the lenses 57a, 57b and 57c. Corresponding to positions of projected images G0, R1, G1, B1 and G2 by the lens 57a, projected images B1, G2, B2, R2 and B3 are formed by the lens 57b, and projected images R2, B3, R3, G3 and R4 are formed by the lens 57c.

In other words, the projected images are formed with overlapping the images of the sub-information pixels in original arrangement shifted by three sub-information pixels. Here, although the description has been made in terms of units of sub-information pixels, practically, the projected images are formed with overlapping the arrangement for each color shifted by three in unit of light exit point. R, G and B are overlapped in one projected image by overlapping the projected images of the light exit points shifted by three.

In this case, if the sub-information pixel in the information pixel is same repetition of R, G and B, the same colors are overlapped. However, in the display apparatus according to the fourth embodiment, since the repetition of R, G and B of the sub-information pixels in the image pixel is in different order, an overlapping of the projected images of the light exit points becomes an overlapping of R, G and B. Moreover, one light exit point group is composed of three sub-information pixels, and one lens is associated with one light exit point group so that the sub-information pixels of different colors are overlapped in the projected image. Consequently, even when the projected image of any light exit point is incident on the pupil, light beams of R, G and B are incident on the pupil and the observer can see a color image. For instance, when the projected images of the light exit points projected on the pupil 59 of the eye are B1, R2 and G3, an image 60 shown in FIG. 18 is observed on the retina.

As mentioned above, the pixel which is observed on the retina is a lens. In FIG. 18, light beams from the sub-information pixels B1, R2 and G3, more elaborately light exit points, pass through the lenses 57a, 57b and 57c respectively. Therefore, when the lenses 57a, 57b and 57c are formed as images on the retina, images of R, G and B are formed. In other words, the observer can see a color image of R, G and B.

For instance, if the size of one side of the information pixel of a high-definition LCD is 90 μm, the sub-information pixels of R, G and B are 30 μm×90 μm. However, combining the three sub-information pixels, it becomes a combined pixel of 90 μm×90 μm which is the same as that of the information pixel. A lens corresponding to the combined pixel is a rectangular-shaped lens of size 90 μm×90 μm. Since an aperture diameter of the lens is large, spreading due to diffraction is suppressed to 1.8 mm.

Although the number of pixels which the observer can observe is reduced to one third, since the diameter of the lens does not decrease, brightness is not reduced. Moreover, a combined micro lens array which is imparted an effect of a field lens 56 to the micro lens array 55 may be used. If the field lens is not used, the arrangement is similar as that in FIG. 16.

Furthermore, other structure, operation, and effect of the present embodiment are common in the above-mentioned embodiments.

Fifth Embodiment

Figure 19:
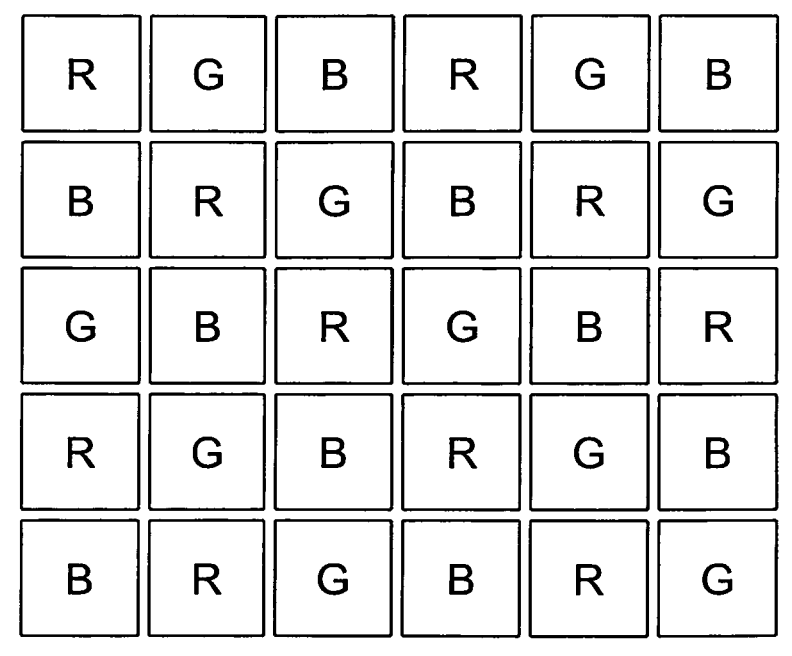
Figure 20:
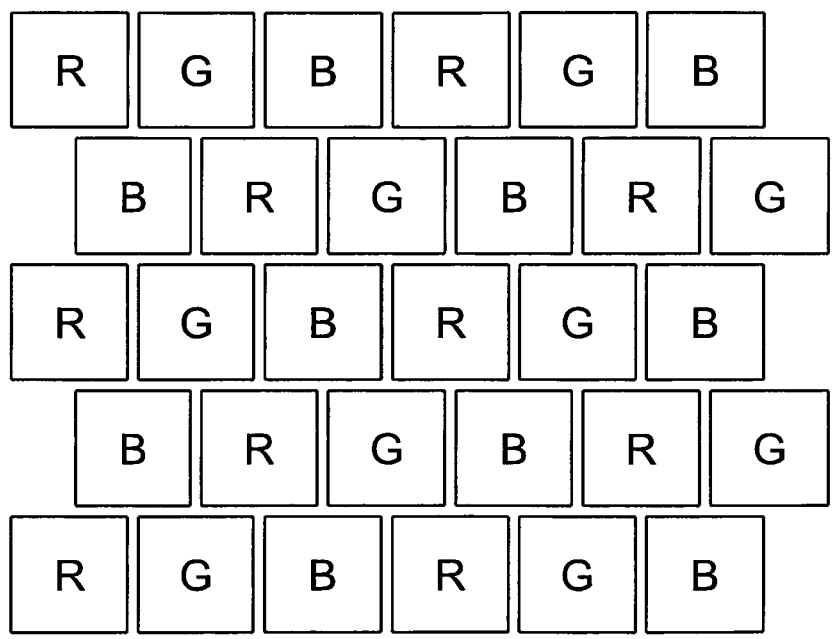
FIG. 20 is a perspective view showing a pixel arrangement for the color display of the liquid crystal display.

FIG. 19 is a perspective view showing a pixel arrangement (diagonal arrangement) for a color display of a liquid crystal display. FIG. 20 is a perspective view showing a pixel arrangement (delta arrangement) for the color display of the liquid crystal display. FIG. 19 and FIG. 20 show pixel arrangements for the color display of the liquid crystal display which are used normally.

Figure 21:
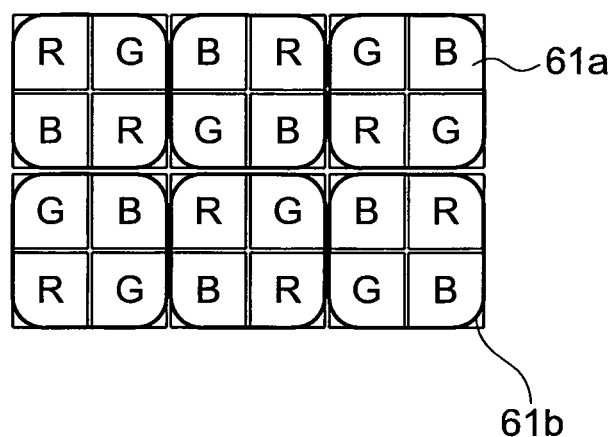
FIG. 21 is a diagram showing an example of a diagonal arrangement of sub-information pixels for a color display according to a fifth embodiment of the present invention.
Figure 22:
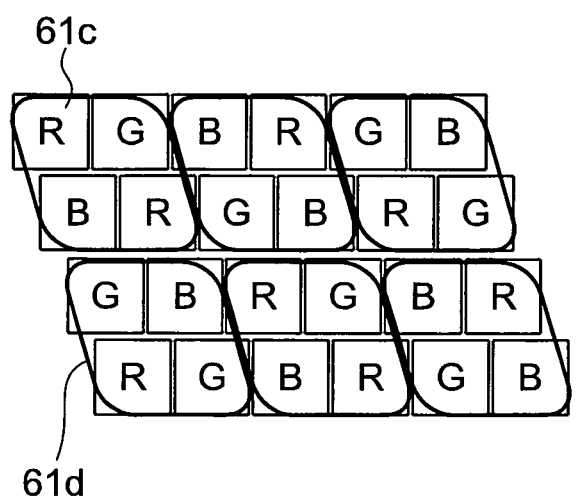
FIG. 22 is a diagram showing an example of a delta arrangement of sub-information pixels for a color display according to the fifth embodiment of the present invention.

FIG. 21 is a diagram showing an example of a diagonal arrangement of the sub-information pixels for a color display according to a fifth embodiment of the present invention. FIG. 22 is a diagram showing an example of a delta arrangement of the sub-information pixels for a color display according to the fifth embodiment.

In the pixel arrangement of color display, the diagonal arrangement (mosaic) shown in FIG. 21 and the delta arrangement shown in FIG. 22 are available apart from a rectangular-shaped stripe arrangement already shown. In these cases as well, it is possible to overlap beams of R, G and B on the pupil by combining four sub-information pixels and associating with one lens. Concretely, in FIG. 21, one information pixel 61b consists of four sub-information pixels 61a, and the information pixel 61b is associated with one lens. In FIG. 22, one information pixel 61d consists of four sub-information pixels 61c, and the information pixel 61d is associated with one lens.

Accordingly, even when the sub-information pixels are small, it is possible to make an aperture diameter of the lens large, and it is possible to suppress the spreading of light exit points on the pupil due to diffraction.

Furthermore, other structure, operation, and effect of the present embodiment are common in the above-mentioned embodiments.

Sixth Embodiment

Figure 23:
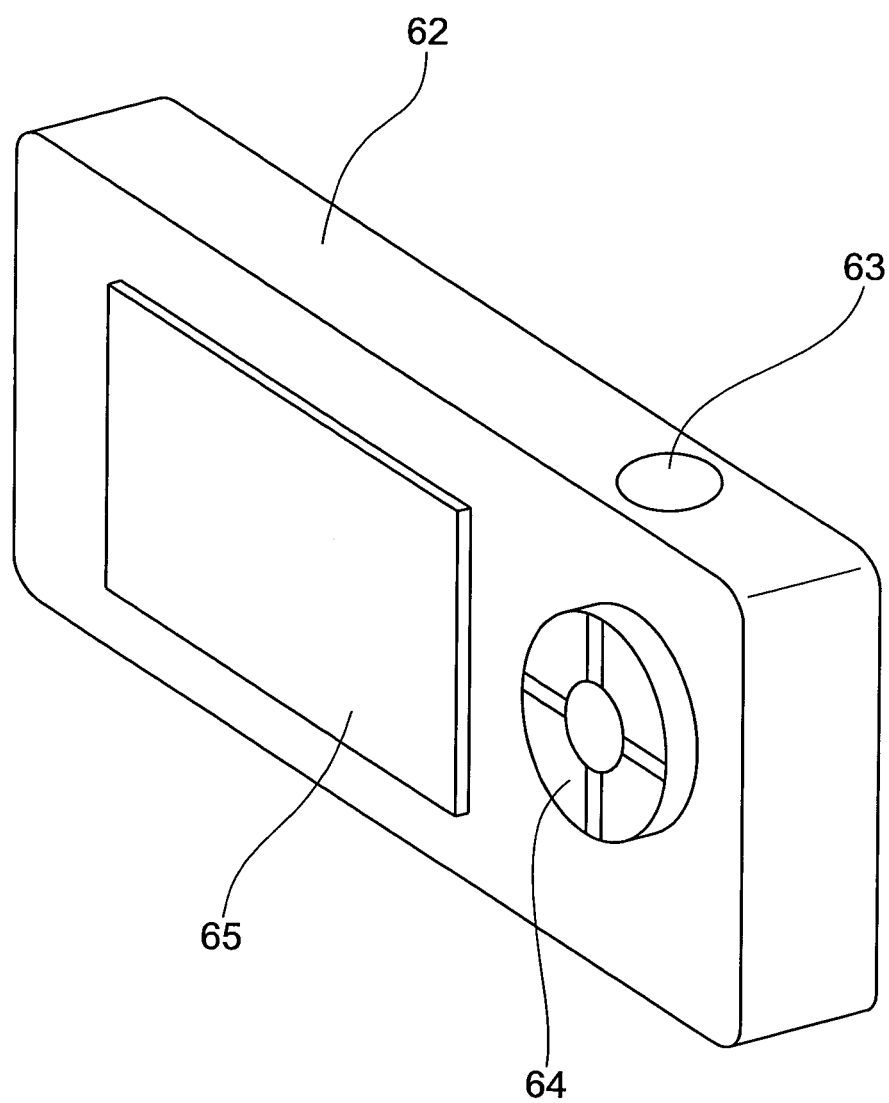
FIG. 23 is a perspective view showing a digital camera according to a sixth embodiment of the present invention.

In FIG. 23, a digital camera in which the above-mentioned display apparatus is used is shown as an example of an image pickup apparatus. FIG. 23 is a perspective view showing a digital camera according to a sixth embodiment.

A digital camera 62 includes an image pickup lens at a front surface thereof, which is not shown in the diagram. The digital camera 62 is provided with a release button 63, a mode button 64, and a display apparatus 65. A user (an observer) takes a picture by pressing the release button 63 while checking on the display apparatus 65 an image which has been picked up by the image pickup lens.

As the display apparatus 65 of the digital camera 62, a liquid crystal display of a pixel structure having the micro lens array 33 and the black matrix 32 shown in FIG. 8 is used. Accordingly, even a farsighted person due to old age, a nearsighted person, or an astigmatic person can see an image displayed on the display apparatus 65 without putting on or taking off glasses. Moreover, it is possible to recognize a focus and a picture composition. Furthermore, since it is possible to see a focused image, it is possible to recognize a GUI (graphical user interface), thereby it is possible to take a picture by selecting a capture mode of one's choice by the mode button 64. In other words, upon providing a monitor (the display apparatus 65) which enables even a farsighted person due to old age, a nearsighted person, or an astigmatic person to recognize the display without putting on or taking off glasses, it is possible to use essential functions of devices. A mode button is a type of a switch for setting capture conditions such as, a capture sensitivity, and a scene mode, and a night-view mode. The mode button also includes a zoom lever (switch for operating zooming) which is not shown in the diagram. Here, only one mode button is shown, but a plurality of mode buttons may be provided.

Furthermore, other structure, operation, and effect of the display apparatus are common in the above-mentioned embodiments.

Seventh Embodiment

Figure 24:
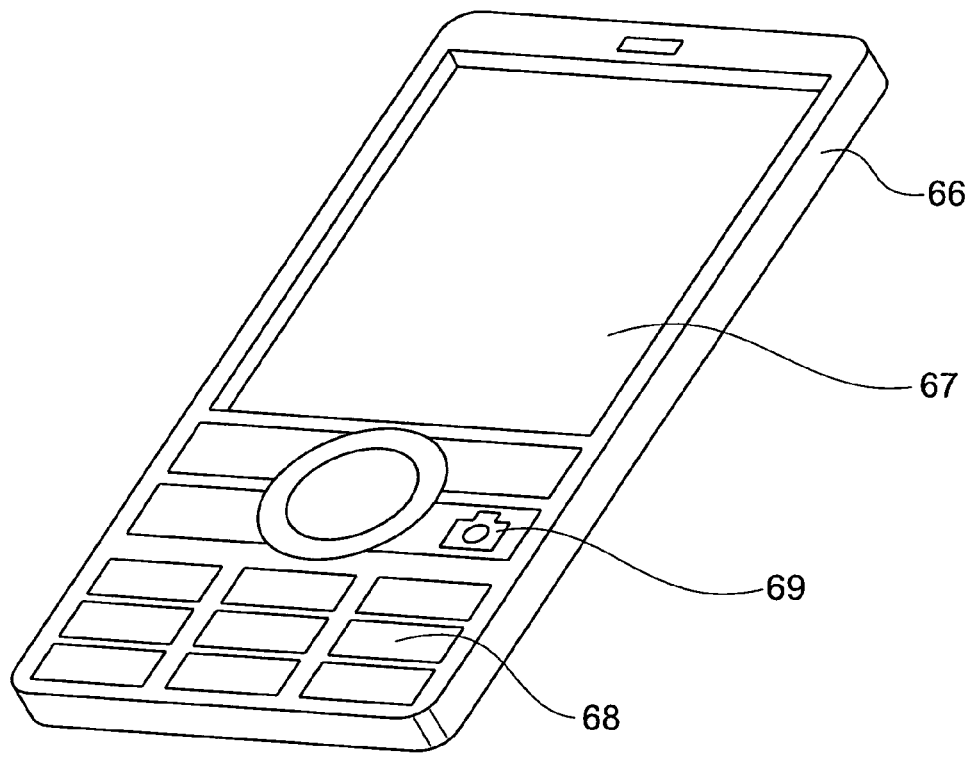
FIG. 24 is a perspective view showing a mobile telephone according to a seventh embodiment of the present invention.

FIG. 24 shows a mobile telephone as an example of the mobile electronic equipment. FIG. 24 is a perspective view showing a mobile telephone according to a seventh embodiment.

A mobile telephone 66 includes a switch for conversation, a numerical keypad 68 for inputting characters, and a display apparatus 67. The mobile telephone includes not only the telephone but also the display apparatus 67 for acquiring information by mail and the Internet connection.

The mobile telephone 66 uses a liquid crystal device of a pixel structure, having the micro lens array 33 and the black matrix 32, shown in FIG. 8, as the display apparatus 67. Accordingly, even a farsighted person due to old age, a nearsighted person, or an astigmatic person can see in a focused state, information displayed on the display apparatus 67 without putting on or taking off glasses. Consequently, it is possible not only to make a telephone call but also to send a mail. Moreover, by pressing a camera-mode switch 69, it is possible to capture a photo by a camera not shown in the diagram, which is provided integrally in the mobile telephone 66. Even a farsighted person due to old age, a nearsighted person, or an astigmatic person can take a photo while checking a focus and a composition by using the display apparatus 67, without putting on or taking off reading glasses. Moreover, even a farsighted person due to old age, a nearsighted person, or an astigmatic person can see the image in a focused state which has been displayed on the display apparatus 67 without putting on or taking off glasses. In other words, since the mobile telephone 66 includes the monitor (the display apparatus 67), on which even a farsighted person due to old age, a nearsighted person, or an astigmatic person can see the display without putting on or taking off glasses, thereby it is possible to use a function which has been added to the mobile telephone.

Furthermore, other structure, operation, and effect of the present embodiment are common in the above-mentioned embodiments.

As described above, the display apparatus, and the electronic equipment, the mobile electronic equipment, the mobile telephone and the image pickup apparatus, which include the display apparatus according to the present invention are useful in a mobile equipment such as a mobile telephone, a digital camera, and an electronic book.

According to the present invention, there is shown an effect that it is possible to provide a display apparatus in which, focusing is easy, and an electronic equipment, a mobile electronic equipment, a mobile telephone, and an image pickup apparatus which include the display apparatus.

What is claimed is:

1. A display apparatus comprising:
   a liquid crystal layer;
   two electrode layers which sandwich the liquid crystal layer; and
   a black matrix; wherein
   the black matrix has a plurality of light exit points which transmit light, and
   a light exit point group includes at least one light exit point, and
   the display apparatus has a plurality of lenses which project the light exit point group, and
   the plurality of lenses project images of the light exit point groups to be overlapped, and
   projected images of the plurality of lenses are formed on a retina of an eye of an observer by inducing overlapping of light exit points in the light exit point group, which have been projected by the lenses to be overlapped, on a pupil of the eye of the observer.

2. The display apparatus according to claim 1, wherein a size of the image of the light exit point projected by the lens is smaller than a diameter of the pupil of the eye of the observer.

3. The display apparatus according to claim 1, wherein the black matrix is composed of a resin material which includes one of chromium and black carbon.

4. The display apparatus according to claim 1, wherein light exit points of the black matrix consist of color filters which transmit lights of at least three colors.

5. The display apparatus according to claim 4, wherein the three colors include R, G, and B.

6. The display apparatus according to claim 4, wherein the color filter is protected by a protective layer.

7. The display apparatus according to claim 4, comprising:
   information pixels which include sub-information pixels of different colors, wherein
   lenses are provided corresponding to the sub-information pixels.

8. The display apparatus according to claim 7, wherein an arrangement of the sub-information pixels is in a rectangular shape.

9. The display apparatus according to claim 7, wherein an arrangement of the sub-information pixels is in a delta shape.

10. The display apparatus according to claim 7, wherein an arrangement of the sub-information pixels is in a diagonal shape.

11. The display apparatus according to claim 4, wherein one light exit point group is composed by a plurality of sub-information pixels, and is associated with one lens so that light exit points of sub information pixels of different colors are overlapped in a projected image.

12. The display apparatus according to claim 11, wherein the information pixel includes sub-information pixels, each of which is a same repetition of three colors, and the number of sub-information pixels which compose the light exit point group is either two or four.

13. The display apparatus according to claim 11, wherein
the information pixel includes sub-information pixels of three colors in different order, and
the number of sub-information pixels which compose the light exit point group is three.

14. The display apparatus according to claim 1, wherein a size of the image of the light exit point is in a range of 0.5 mm to 2.8 mm.

15. The display apparatus according to claim 1, wherein an interval Pp of the light exit point groups and an interval Lp of the lenses satisfy the following expression (1)

$$Lp/Pp=L/(L+fb) \quad (1)$$

where,
fb denotes a distance between the light exit point group and the lens, and
L denotes a distance of the lens up to the pupil of the observer.

16. The display apparatus according to claim 1, wherein
the light exit point groups and the lenses are disposed at the same interval, and
the display apparatus comprises a field lens, which projects the images of each light exit point groups to be overlapped mutually.

17. The display apparatus according to claim 1, wherein
the light exit point groups and the lenses are disposed at the same interval, and
the plurality of lenses forms a micro lens array, which has an effect of a field lens.

18. The display apparatus according to claim 1, wherein a size of the lens is not less than 50 μm.

19. The display apparatus according to claim 1, wherein a light source is an LED or an LD.

20. An electronic equipment comprising:
a display apparatus according to claim 1.

21. A mobile electronic equipment comprising:
a display apparatus according to claim 1.

22. A mobile telephone comprising:
a display apparatus according to claim 1.

23. The mobile telephone according to claim 22, comprising:
a mail function.

24. The mobile telephone according to claim 22, comprising:
a camera function.

25. An image pickup apparatus comprising:
a display apparatus according to claim 1.

26. The image pickup apparatus according to claim 25, comprising:
a switch for setting capture conditions.

* * * * *